US012741461B2

(12) United States Patent
Yamagishi et al.

(10) Patent No.: US 12,741,461 B2
(45) Date of Patent: Sep. 22, 2026

(54) DRIVE METHOD OF LIQUID DISCHARGE APPARATUS

(71) Applicant: SEIKO EPSON CORPORATION, Tokyo (JP)

(72) Inventors: Ken Yamagishi, Shiojiri (JP); Toshiyuki Yamagata, Shiojiri (JP); Tomohiro Matsubayashi, Matsumoto (JP); Kento Nawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 137 days.

(21) Appl. No.: 18/407,509

(22) Filed: Jan. 9, 2024

(65) Prior Publication Data

US 2024/0227390 A1 Jul. 11, 2024

(30) Foreign Application Priority Data

Jan. 10, 2023 (JP) ................................ 2023-001523

(51) Int. Cl.
*B41J 2/045* (2006.01)

(52) U.S. Cl.
CPC ....... *B41J 2/04581* (2013.01); *B41J 2/04531* (2013.01); *B41J 2/04573* (2013.01)

(58) Field of Classification Search
CPC . B41J 2/04581; B41J 2/04531; B41J 2/04573
See application file for complete search history.

(56) References Cited

U.S. PATENT DOCUMENTS

| | | | | |
|---|---|---|---|---|
| 5,422,665 A * | 6/1995 | Stephany | B41J 2/04563 | 347/17 |
| 2005/0190232 A1* | 9/2005 | Lee | B41J 2/161 | 347/45 |
| 2011/0175956 A1* | 7/2011 | Tsukamoto | B41J 2/04581 | 347/10 |
| 2022/0258472 A1 | 8/2022 | Hirai et al. | | |

FOREIGN PATENT DOCUMENTS

| | | |
|---|---|---|
| JP | 2002-225238 A | 8/2002 |
| JP | 4419412 B2 | 2/2010 |
| JP | 2022-124599 A | 8/2022 |

* cited by examiner

*Primary Examiner* — King Y Poon
(74) *Attorney, Agent, or Firm* — Harness, Dickey & Pierce, P.L.C.

(57) ABSTRACT

There is provided a drive method of a liquid discharge apparatus including a first liquid discharge section having a first piezoelectric element applying a pressure to a liquid in a first pressure chamber be communicated with a first nozzle, a first drive line coupled to the first piezoelectric element, and a first resistor that is configured to measure a temperature of the liquid in the first pressure chamber, a second liquid discharge section having a second piezoelectric element applying a pressure to a liquid in a second pressure chamber be communicated with a second nozzle. The method includes: detecting a potential of first resistor when a state of a potential applied to the first drive line is in a state of causing no liquid to be discharged from the first nozzle, during an execution period of a first printing process of printing a first image on a recording medium.

19 Claims, 12 Drawing Sheets

DRIVE METHOD OF LIQUID DISCHARGE APPARATUS

The present application is based on, and claims priority from JP Application Serial Number 2023-001523, filed Jan. 10, 2023, the disclosure of which is hereby incorporated by reference herein in its entirety.

BACKGROUND

1. Technical Field

The present disclosure relates to a drive method of a liquid discharge apparatus.

2. Related Art

A liquid discharge apparatus typified by an ink jet printer generally includes a liquid discharge head that discharges a liquid such as ink.

For example, a liquid discharge head disclosed in JP-A-2022-124599 includes a nozzle that discharges a liquid, a pressure chamber communicating with the nozzle, a piezoelectric element that causes a pressure fluctuation in a liquid in the pressure chamber, and a resistance line for detecting a temperature of the pressure chamber. Here, the resistance line is made of the same material as an electrode of the piezoelectric element or a line coupled to the electrode.

In the related art, when a temperature of the liquid in the pressure chamber is detected by using the liquid discharge head disclosed in JP-A-2022-124599, there is a problem in that noise from a drive signal for driving the piezoelectric element is superimposed on a detection signal, resulting in a decrease in detection accuracy.

SUMMARY

According to an aspect of the present disclosure, there is provided a drive method of a liquid discharge apparatus including a first liquid discharge section having a first nozzle, a first pressure chamber communicating with the first nozzle, a first piezoelectric element applying a pressure to a liquid in the first pressure chamber, a first drive line coupled to the first piezoelectric element, and a first resistor for measuring a temperature of the liquid in the first pressure chamber, and a second liquid discharge section having a second nozzle, a second pressure chamber communicating with the second nozzle, and a second piezoelectric element applying a pressure to a liquid in the second pressure chamber, in which each of the first piezoelectric element and the second piezoelectric element has a first electrode, a second electrode, and a piezoelectric body disposed between the first electrode and the second electrode, and the first resistor is made of the same material as any of the first electrode, the second electrode, and the first drive line, the method including: detecting a potential of the first resistor when a state of a potential applied to the first drive line is in a state of causing no liquid to be discharged from the first nozzle, during an execution period of a first printing process of printing a first image on a recording medium by a liquid discharged from the second nozzle without discharging a liquid from the first nozzle.

DESCRIPTION OF EMBODIMENTS

Figure 1:
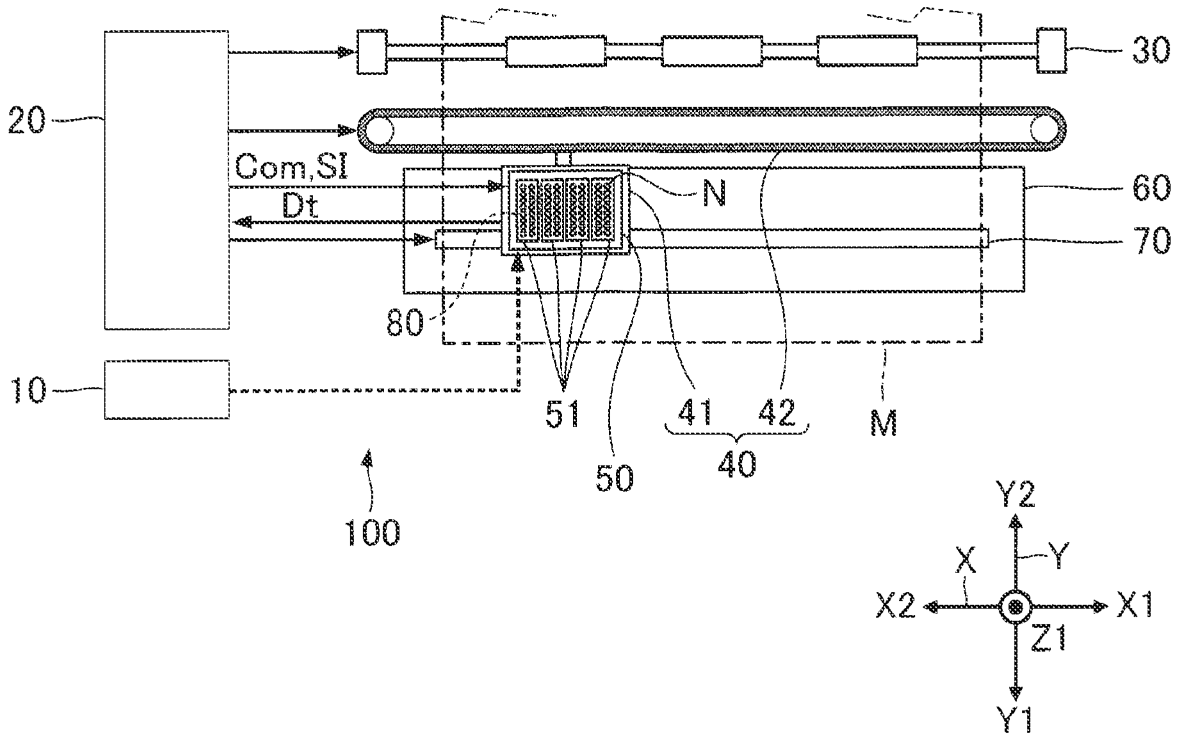
FIG. 1 is a schematic diagram illustrating a configuration example of a liquid discharge apparatus according to a first embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to the forms unless the present disclosure is particularly limited in the following description.

In the following description, for the sake of convenience of specifying a position, direction, or the like, an X axis, a Y axis, and a Z axis that intersect each other are appropriately used. In addition, hereinafter, one direction along the X axis is an X1 direction, and a direction opposite to the X1 direction is an X2 direction. Similarly, directions opposite to each other along the Y axis are a Y1 direction and a Y2 direction. In addition, directions opposite to each other along the Z axis are a Z1 direction and a Z2 direction.

Here, typically, the Z axis is a vertical axis, and the Z2 direction corresponds to a downward direction in a vertical direction. Note that the Z axis does not have to be the vertical axis. In addition, the X axis, the Y axis, and the Z axis are typically orthogonal to each other. However, without being limited to this, all of these need only intersect each other at an angle within a range of, for example, 80° or more and 100° or less.

A: First Embodiment

A1: Overall Configuration of Liquid Discharge Apparatus

FIG. 1 is a schematic diagram illustrating a configuration example of a liquid discharge apparatus 100 according to a first embodiment. The liquid discharge apparatus 100 is an ink jet printing apparatus that discharges ink, which is an example of a "liquid", onto a recording medium M as a liquid droplet. The recording medium M is, for example, printing paper. The recording medium M is not limited to the printing paper, and may be a printing target of any desired material such as a resin film or a cloth.

As illustrated in FIG. 1, the liquid discharge apparatus 100 has a liquid container 10, a control module 20, a transport mechanism 30, a movement mechanism 40, a liquid discharge head 50, a support section 60, and a heater 70.

The liquid container 10 stores an ink. Specific aspects of the liquid container 10 include, for example, a cartridge that can be attached to and detached from the liquid discharge apparatus 100, a bag-shaped ink pack made of a flexible film, and an ink tank that can be refilled with an ink. A type of the ink stored in the liquid container 10 is set in any desired way.

The control module 20 controls an operation of each element of the liquid discharge apparatus 100. Here, the control module 20 outputs a drive signal Com for driving the liquid discharge head 50 and a control signal SI for controlling the drive of the liquid discharge head 50. In addition, a detection signal Dt indicating a temperature of the liquid discharge head 50 is input to the control module 20. The control module 20 corrects the drive signal Com or adjusts a set temperature of the heater 70, based on the detection signal Dt. Details of the control module 20 will be described below with reference to FIG. 2.

The transport mechanism 30 transports the recording medium M along the Y axis under the control of the control module 20.

The movement mechanism 40 reciprocates the liquid discharge head 50 along the X axis under the control of the control module 20. The movement mechanism 40 has a substantially box-shaped transport body 41 called a carriage that accommodates the liquid discharge head 50, and an endless transport belt 42 to which the transport body 41 is fixed. The number of the liquid discharge heads 50 mounted on the transport body 41 is not limited to one, and may be plural. In addition to the liquid discharge head 50, the above-described liquid container 10 may be mounted on the transport body 41.

Under the control of the control module 20, the liquid discharge head 50 discharges the ink supplied from the liquid container 10 onto the recording medium M from each of a plurality of nozzles. This discharge is performed in parallel with the transport of the recording medium M by the transport mechanism 30 and the reciprocating movement of the liquid discharge head 50 by the movement mechanism 40, thereby forming an image by an ink on a surface of the recording medium M.

In the example illustrated in FIG. 1, the liquid discharge head 50 includes a plurality of head chips 51. The head chip 51 has a plurality of nozzles N for discharging an ink. A configuration example of the head chip 51 will be described below with reference to FIGS. 3 to 7. The number of the head chips 51 included in the liquid discharge head 50 is not limited to the example illustrated in FIG. 1, and may be one or more and three or less, or five or more.

The support section 60 is a stand that supports the recording medium M in a state of receiving an impact of the ink discharged from the liquid discharge head 50, and is also called a platen. Such a support section 60 supports the recording medium M that faces the plurality of nozzles N of the liquid discharge head 50 during printing.

The heater 70 heats the support section 60 to a set temperature under the control of the control module 20. This heating can accelerate drying of the ink on the recording medium M. As a result, the ink on the recording medium M is retained at a desired position, so that an image quality can be improved.

A2: Electrical Configuration of Liquid Discharge Apparatus

Figure 2:
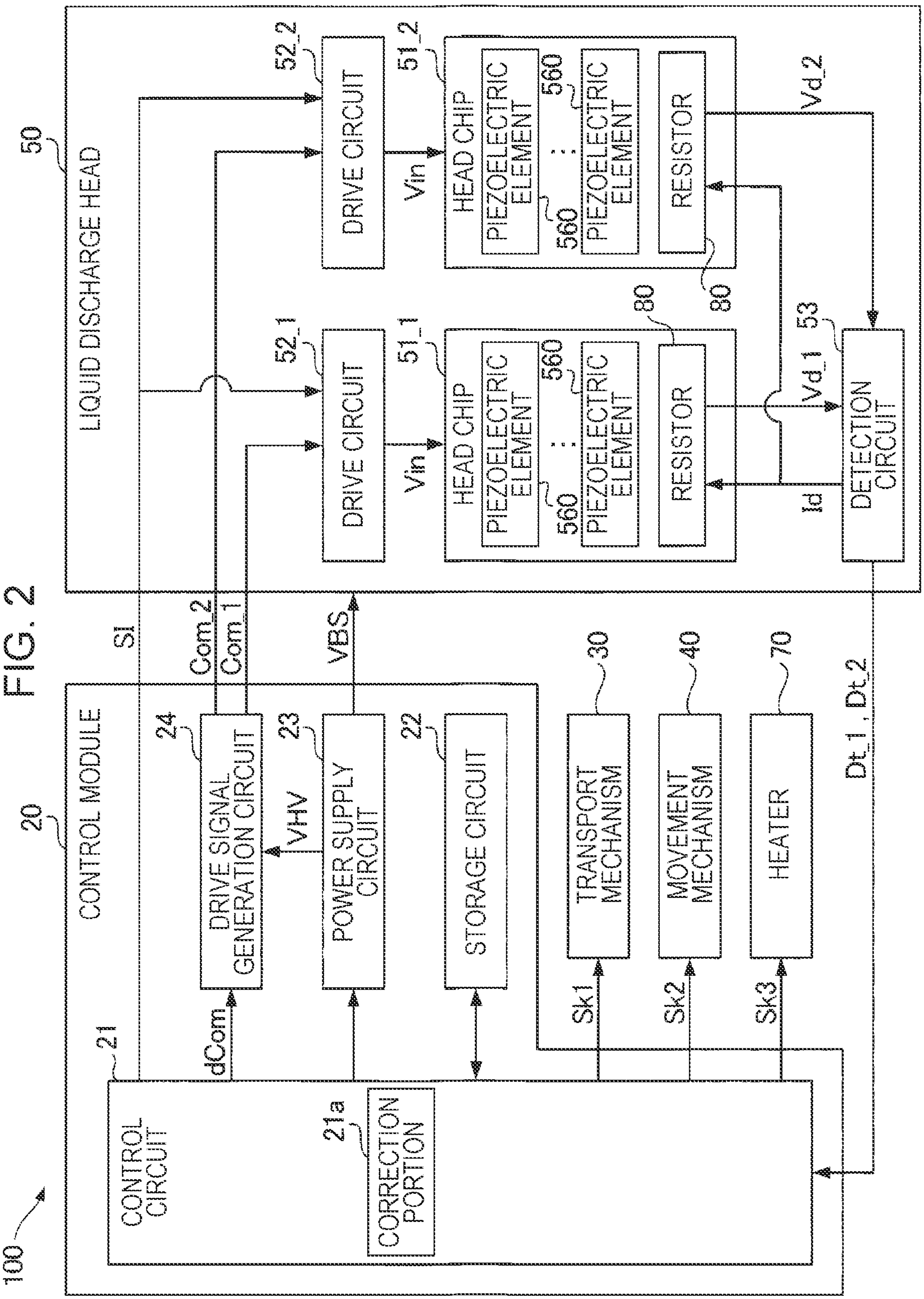
FIG. 2 is a block diagram illustrating an electrical configuration of the liquid discharge apparatus according to the first embodiment.

FIG. 2 is a block diagram illustrating an electrical configuration of the liquid discharge apparatus 100 according to the first embodiment. As illustrated in FIG. 2, the liquid discharge head 50 has head chips 51_1 and 51_2, drive circuits 52_1 and 52_2, and a detection circuit 53. In FIG. 2, the head chips 51_1 and 51_2 are typically illustrated as two head chips 51 among the plurality of head chips 51. Note that, although one head chip 51_1 and one head chip 51_2 are illustrated in FIG. 2, the liquid discharge head 50 has a plurality of the head chips 51_1 and a plurality of the head chips 51_2.

The head chip 51_1 and the head chip 51_2 are configured in the same manner as each other except that different types of ink are used. Examples of a combination of the types of inks used for the head chip 51_1 and the head chip 51_2 include a combination of a color ink and a white ink, a combination of a matte black ink and a photo black ink, a combination of a top coat clear ink and a color ink, a combination of a metallic ink and a color ink, and a combination of a black ink and a color ink other than black.

Each of the head chips 51_1 and 51_2 has a plurality of piezoelectric elements 560 and a resistor 80. Here, the piezoelectric element 560 included in the head chip 51_1 is an example of a "first piezoelectric element". The piezoelectric element 560 included in the head chip 51_2 is an example of a "second piezoelectric element". The resistor 80 included in the head chip 51_1 is an example of a "first resistor". The resistor 80 included in the head chip 51_2 is an example of a "second resistor".

Each of the plurality of piezoelectric elements 560 included in the head chip 51_1 is driven by an inverse piezoelectric effect by receiving a supply of a supply drive signal Vin_1. Similarly, each of the plurality of piezoelectric elements 560 included in the head chip 51_2 is driven by an inverse piezoelectric effect by receiving a supply of a supply drive signal Vin_2. The resistor 80 has a characteristic that a resistance value changes according to a change in temperature. Details of the head chip 51 will be described below with reference to FIGS. 3 to 7. Hereinafter, each of the supply drive signals Vin_1 and Vin_2 may be referred to as a supply drive signal Vin.

The drive circuit 52_1 is provided to correspond to each head chip 51_1, and drives the piezoelectric element 560 of the corresponding head chip 51_1 under the control of the control module 20. Similarly, the drive circuit 52_2 is provided to correspond to each head chip 51_2, and drives the piezoelectric element 560 of the corresponding head chip 51_2 under the control of the control module 20.

Here, the control module 20 outputs individual drive signals Com_1 and Com_2 as the drive signal Com. Under the control of the control module 20, the drive circuit 52_1 switches whether or not to supply the drive signal Com_1 output from the control module 20 as the supply drive signal Vin_1 to each of the plurality of piezoelectric elements 560 included in the head chip 51_1. Similarly, under the control of the control module 20, the drive circuit 52_2 switches whether or not to supply the drive signal Com_2 output from the control module 20 as the supply drive signal Vin_2 to each of the plurality of piezoelectric elements 560 included in the head chip 51_2. Hereinafter, each of the drive circuits 52_1 and 52_2 may be referred to as a drive circuit 52.

The detection circuit 53 is a circuit for detecting a temperature of each of the head chips 51_1 and 51_2.

Specifically, the detection circuit 53 has a circuit that supplies a current Id to the resistor 80 of the head chip 51_1 and a circuit that detects a potential Vd_1 corresponding to a voltage applied to the resistor 80 of the head chip 51_1, and outputs a detection signal Dt_1 corresponding to the potential Vd_1. Similarly, the detection circuit 53 has a circuit that supplies a current Id to the resistor 80 of the head chip 51_2 and a circuit that detects a potential Vd_2 corresponding to a voltage applied to the resistor 80 of the head chip 51_2, and outputs a detection signal Dt_2 corresponding to the potential Vd_2. Hereinafter, each of the potential Vd_1 and the potential Vd_2 may be referred to as a potential Vd. Each of the detection signal Dt_1 and the detection signal Dt_2 may be referred to as a detection signal Dt.

The current Id is a predetermined constant current that flows between two predetermined positions such as both ends of the resistor 80. The potential Vd is a potential of the resistor 80 with a constant potential, such as an offset potential VBS, as a reference potential. The potential Vd changes according to a resistance value of the resistor 80. As described above, since the resistance value of the resistor 80 changes according to a change in temperature, the potential Vd changes according to a change in temperature. Therefore, the detection signal Dt corresponding to the potential Vd is a signal indicating the temperature of the head chip 51, more specifically, a temperature of an ink in a pressure chamber C (to be described below) of the head chip 51.

As illustrated in FIG. 2, the control module 20 has a control circuit 21, a storage circuit 22, a power supply circuit 23, and a drive signal generation circuit 24.

The control circuit 21 has a function of controlling an operation of each portion of the liquid discharge apparatus 100 and a function of processing various data.

The control circuit 21 includes, for example, one or more processors such as a central processing unit (CPU). The control circuit 21 may include a programmable logic device such as a field-programmable gate array (FPGA) instead of the CPU or in addition to the CPU. In addition, when the control circuit 21 is configured of a plurality of processors, for example, an operation control of the drive circuit 52 and an operation control of the detection circuit 53 may be performed by separate processors. In addition, when the control circuit 21 is configured of a plurality of processors, the plurality of processors may be mounted on different substrates or the like.

The storage circuit 22 stores various programs executed by the control circuit 21 and various data such as print data processed by the control circuit 21. The storage circuit 22 includes, for example, a semiconductor memory of one or both of a volatile memory such as a random access memory (RAM) and a non-volatile memory such as a read only memory (ROM), an electrically erasable programmable read-only memory (EEPROM) or a programmable ROM (PROM). The print data is supplied from an external device such as a personal computer or a digital camera. A part or an entirety of the storage circuit 22 may be configured as a part of the control circuit 21.

The power supply circuit 23 receives a supply of power from a commercial power supply (not illustrated), and generates various predetermined potentials. The generated various potentials are appropriately supplied to each portion of the liquid discharge apparatus 100. For example, the power supply circuit 23 generates a power supply potential VHV and an offset potential VBS. The offset potential VBS is supplied to the liquid discharge head 50. In addition, the power supply potential VHV is supplied to the drive signal generation circuit 24.

The drive signal generation circuit 24 is a circuit that generates the drive signal Com for driving each piezoelectric element 560. Specifically, the drive signal generation circuit 24 has, for example, a DA conversion circuit and an amplifier circuit. In the drive signal generation circuit 24, the DA conversion circuit converts, from a digital signal to an analog signal, a waveform designation signal dCom from the control circuit 21, and the amplifier circuit generates the drive signal Com by amplifying the analog signal using the power supply potential VHV from the power supply circuit 23. Here, among waveforms included in the drive signal Com, a signal of a waveform actually supplied to the piezoelectric element 560 is the above-described supply drive signal Vin. The waveform designation signal dCom is a digital signal for defining a waveform of the drive signal Com.

In the present embodiment, the drive signal generation circuit 24 individually generates the drive signal Com_1 and the drive signal Com_2 as the drive signal Com. The drive signal Com_1 is the drive signal Com to be supplied to the drive circuit 52_1, and includes a waveform for driving the piezoelectric element 560 of the head chip 51_1. The drive signal Com_2 is the drive signal Com to be supplied to the drive circuit 52_2, and includes a waveform for driving the piezoelectric element 560 of the head chip 51_2. Such a drive signal generation circuit 24 individually has, for example, a DA conversion circuit and an amplifier circuit for generating the drive signal Com_1, and a DA conversion circuit and an amplifier circuit for generating the drive signal Com_2. The waveform designation signal dCom includes a signal for defining a waveform of the drive signal Com_1 and a signal for defining a waveform of the drive signal Com_2.

The drive signal generation circuit 24 may generate a single drive signal Com for driving the piezoelectric element 560 of the head chip 51_1 and the piezoelectric element 560 of the head chip 51_2.

In the above control module 20, the control circuit 21 controls the operation of each portion of the liquid discharge apparatus 100 by executing the program stored in the storage circuit 22. Here, the control circuit 21 executes the program, thereby generating a control signal Sk1, a control signal Sk2, a control signal Sk3, a control signal SI, and the waveform designation signal dCom as a signal for controlling the operation of each portion of the liquid discharge apparatus 100.

The control signal Sk1 is a signal for controlling the drive of the transport mechanism 30. The control signal Sk2 is a signal for controlling the drive of the movement mechanism 40. The control signal Sk3 is a signal for controlling the drive of the heater 70. The control signal SI is a digital signal for designating an operating state of the piezoelectric element 560. The control signal SI may include a timing signal for defining a drive timing of the piezoelectric element 560. The timing signal is generated, for example, based on an output of an encoder that detects a position of the above-described transport body 41.

In addition, the control circuit 21 functions as a correction portion 21*a* by executing a program stored in the storage circuit 22.

The correction portion 21*a* adjusts one or both of the waveform designation signal dCom and the control signal Sk3 based on the detection signal Dt. Through this adjustment, the correction portion 21*a* corrects the drive signal Com or the set temperature of the heater 70.

A3: Head

Figure 3:
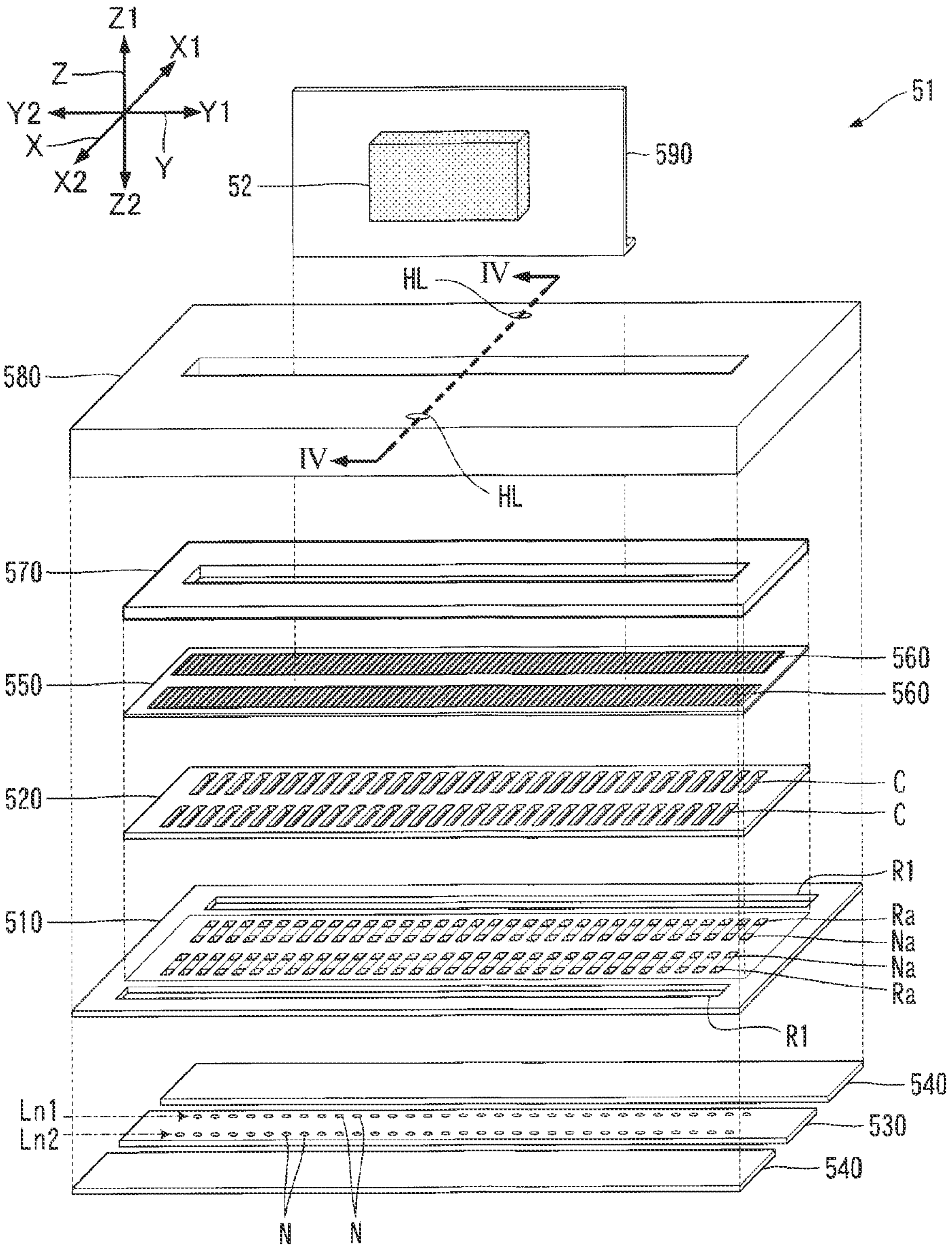
FIG. 3 is an exploded perspective view of a head chip according to the first embodiment.
Figure 4:
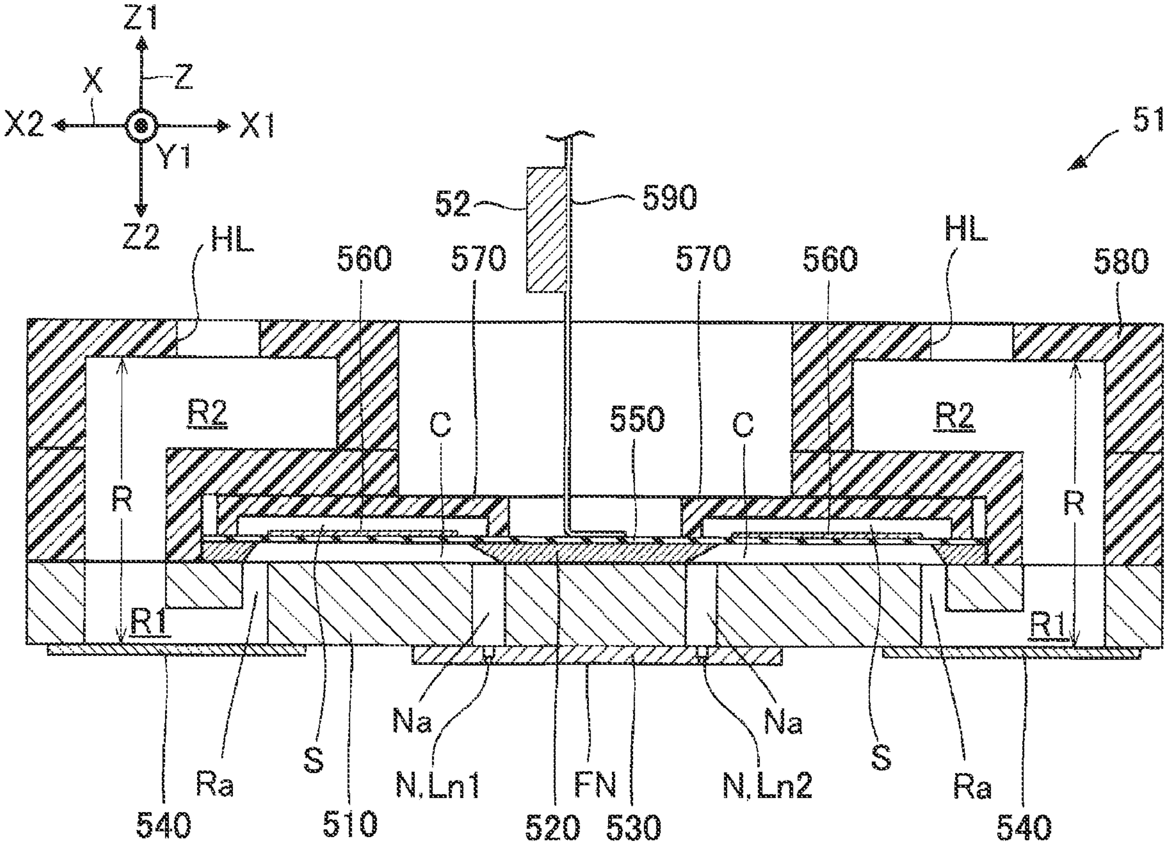
FIG. 4 is a cross-sectional view of the head chip according to the first embodiment.

FIG. 3 is an exploded perspective view of the head chip 51 according to the first embodiment. FIG. 4 is a cross-sectional view of the head chip 51 according to the first embodiment. FIG. 4 is a cross-sectional view taken along the line IV-IV in FIG. 3.

As illustrated in FIGS. 3 and 4, the head chip 51 has the plurality of nozzles N arranged in a direction along the Y axis. Here, the nozzle N included in the head chip 51_1 described above is an example of a "first nozzle". The nozzle N included in the head chip 51_2 described above is an example of a "second nozzle".

The plurality of nozzles N included in the head chip 51 are divided into a first nozzle row Ln1 and a second nozzle row Ln2 arranged at a distance in a direction along the X axis. Each of the first nozzle row Ln1 and the second nozzle row Ln2 is a set of the plurality of nozzles N linearly arranged in the direction along the Y axis.

The head chip 51 has a substantially symmetrical configuration in the direction along the X axis. Note that positions of the plurality of nozzles N of the first nozzle row Ln1 and the plurality of nozzles N of the second nozzle row Ln2 in the direction along the Y axis may coincide with or may be different from each other. FIGS. 3 and 4 illustrates a configuration in which the positions of the plurality of nozzles N of the first nozzle row Ln1 and the plurality of nozzles N of the second nozzle row Ln2 coincide with each other in the direction along the Y axis.

As illustrated in FIGS. 3 and 4, the head chip 51 has a flow path substrate 510, a pressure chamber substrate 520, a nozzle substrate 530, a vibration absorbing body 540, a diaphragm 550, the plurality of piezoelectric elements 560, a protective substrate 570, a case 580, and a wiring substrate 590.

The flow path substrate 510 and the pressure chamber substrate 520 are laminated in this order in the Z1 direction, and form a flow path for supplying an ink to the plurality of nozzles N. The diaphragm 550, the plurality of piezoelectric elements 560, the protective substrate 570, the case 580, the wiring substrate 590, and the drive circuit 52 are installed in a region that is located in the Z1 direction with respect to a laminate of the flow path substrate 510 and the pressure chamber substrate 520. On the other hand, the nozzle substrate 530 and the vibration absorbing body 540 are installed in a region that is located in the Z2 direction with respect to the laminate. Each element of the head chip 51 is schematically a plate-shaped member elongated in the Y direction, and the elements are joined to each other by, for example, using an adhesive. Hereinafter, each element of the head chip 51 will be described in order.

The nozzle substrate 530 is a plate-shaped member provided with the plurality of nozzles N of each of the first nozzle row Ln1 and the second nozzle row Ln2. Each of the plurality of nozzles N is a through-hole through which an ink passes. Here, a surface of the nozzle substrate 530 facing the Z2 direction is a nozzle surface FN. The nozzle substrate 530 is manufactured by processing a silicon single crystal substrate by, for example, a semiconductor manufacturing technology using a processing technique such as dry etching or wet etching. Note that other known methods and materials may be appropriately used for manufacturing the nozzle substrate 530. In addition, a cross-sectional shape of the nozzle is typically a circular shape, but the shape is not limited to this, and may be a non-circular shape such as a polygon or an ellipse.

The flow path substrate 510 is provided with a space R1, a plurality of supply flow paths Ra, and a plurality of communication flow paths Na for each of the first nozzle row Ln1 and the second nozzle row Ln2. The space R1 is an elongated opening extending in the direction along the Y axis in plan view in a direction along the Z axis. Each of the supply flow path Ra and the communication flow path Na is a through-hole formed for each nozzle N. Each supply flow path Ra communicates with the space R1.

The pressure chamber substrate 520 is a plate-shaped member in which a plurality of pressure chambers C called cavities are provided for each of the first nozzle row Ln1 and the second nozzle row Ln2. The plurality of pressure chambers C are arranged in the direction along the Y axis. Each of the pressure chambers C is formed for each nozzle N, and is an elongated space extending in the direction along the X axis in plan view. In the present embodiment, the pressure chamber C of the head chip 51_1 described above is an example of a "first pressure chamber", and the pressure chamber C of the head chip 51_2 described above is an example of a "second pressure chamber".

Each of the flow path substrate 510 and the pressure chamber substrate 520 is manufactured by processing a silicon single crystal substrate by, for example, a semiconductor manufacturing technology in the same manner as the nozzle substrate 530 described above. Note that other known methods and materials may be appropriately used for manufacturing each of the flow path substrate 510 and the pressure chamber substrate 520.

The pressure chamber C is located between the flow path substrate 510 and the diaphragm 550. The plurality of pressure chambers C are arranged in the direction along the Y axis for each of the first nozzle row Ln1 and the second nozzle row Ln2. In addition, the pressure chamber C communicates with each of the communication flow path Na and the supply flow path Ra. Therefore, the pressure chamber C communicates with the nozzle N via the communication flow path Na, and communicates with the space R1 via the supply flow path Ra.

The diaphragm 550 is disposed on a surface of the pressure chamber substrate 520 facing the Z1 direction. The diaphragm 550 is a plate-shaped member that can vibrate elastically. Details of the diaphragm 550 will be described below with reference to FIGS. 5 to 7.

The plurality of piezoelectric elements 560 corresponding to the nozzles N are disposed on a surface of the diaphragm 550 facing the Z1 direction for each of the first nozzle row Ln1 and the second nozzle row Ln2. Each of the piezoelectric elements 560 is a passive element that is deformed by the supply of the supply drive signal Vin corresponding to the drive signal Com, and causes a pressure fluctuation in the ink in the pressure chamber C. Each of the piezoelectric elements 560 has an elongated shape extending in the direction along the X axis in plan view. The plurality of piezoelectric elements 560 are arranged in a direction along the Y axis so as to correspond to the plurality of pressure chambers C. The piezoelectric element 560 overlaps the pressure chamber C in plan view. Details of the piezoelectric element 560 will be described below with reference to FIGS. 5 to 7.

The protective substrate 570 is a plate-shaped member installed on the surface of the diaphragm 550 facing the Z1 direction, protects the plurality of piezoelectric elements 560, and reinforces a mechanical strength of the diaphragm 550. Here, the plurality of piezoelectric elements 560 are accommodated in a space S between the protective substrate 570 and the diaphragm 550. The protective substrate 570 is made of, for example, a resin material.

The case 580 is a case for storing an ink to be supplied to the plurality of pressure chambers C. The case 580 is made of, for example, a resin material. The case 580 is provided with a space R2 for each of the first nozzle row Ln1 and the second nozzle row Ln2. The space R2 is a space communicating with the above-described space R1, and functions as a reservoir R that stores the ink to be supplied to the plurality of pressure chambers C together with the space R1. The case 580 is provided with an inlet HL for supplying the ink to each reservoir R. The ink in each reservoir R is supplied to the pressure chamber C via each supply flow path Ra.

The vibration absorbing body 540 is also called a compliance substrate, is a flexible resin film forming a wall surface of the reservoir R, and absorbs the pressure fluctuation in the ink in the reservoir R. The vibration absorbing body 540 may be a flexible thin plate made of metal. A surface of the vibration absorbing body 540 facing the Z1 direction is joined to the flow path substrate 510 by using an adhesive or the like.

The wiring substrate 590 is mounted on the surface of the diaphragm 550 facing the Z1 direction, and is a mounting component for electrically coupling the control module 20 and the head chip 51. The wiring substrate 590 is, for example, a flexible wiring substrate such as a chip on film (COF), a flexible printed circuit (FPC) or a flexible flat cable (FFC). The drive circuit 52 described above is mounted on the wiring substrate 590 of the present embodiment. The wiring substrate 590 may be a rigid substrate. In this case, the drive circuit 52 is mounted on the rigid substrate or on a flexible substrate coupled to the rigid substrate.

Figure 5:
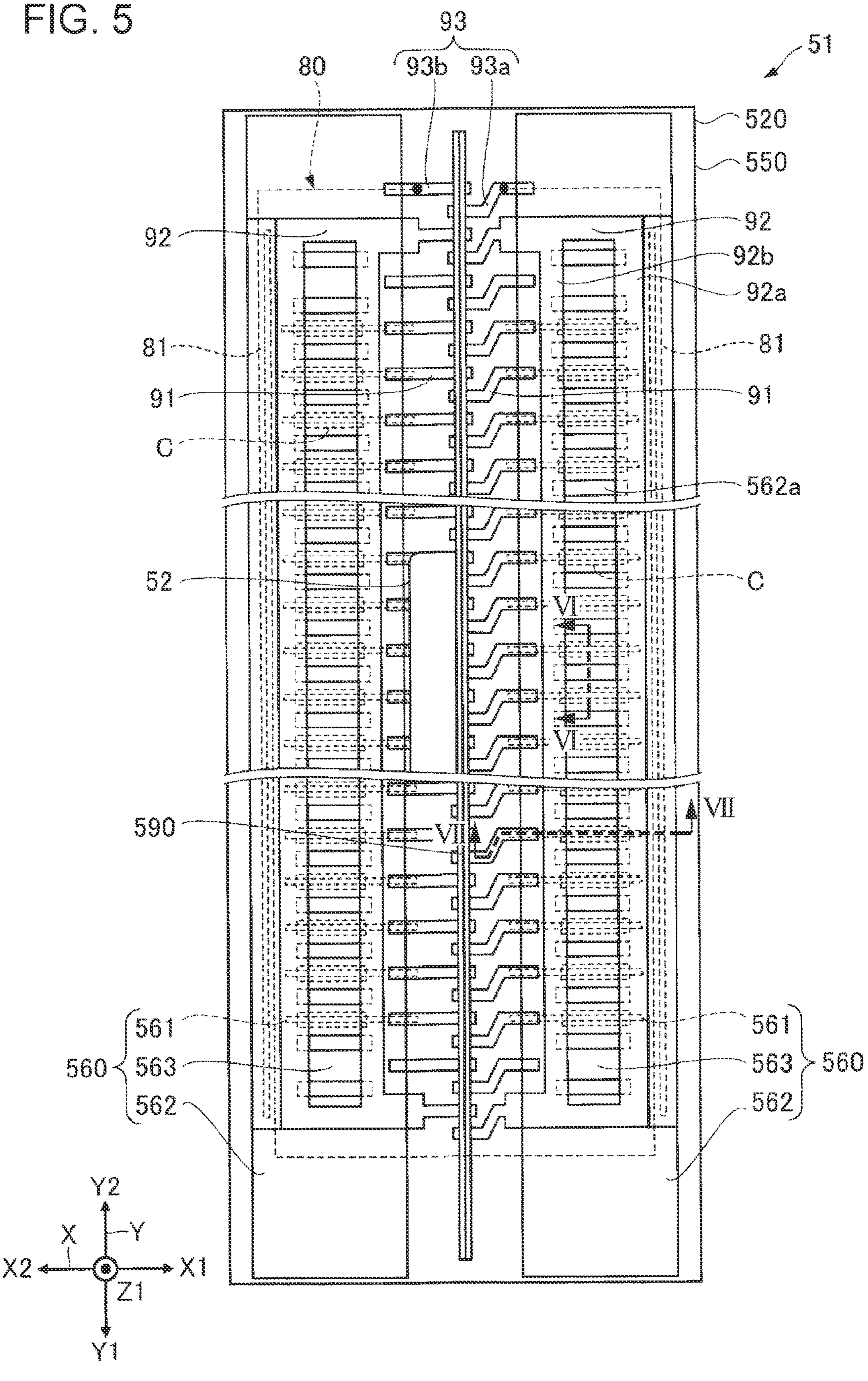
FIG. 5 is a plan view of the head chip according to the first embodiment.
Figure 6:
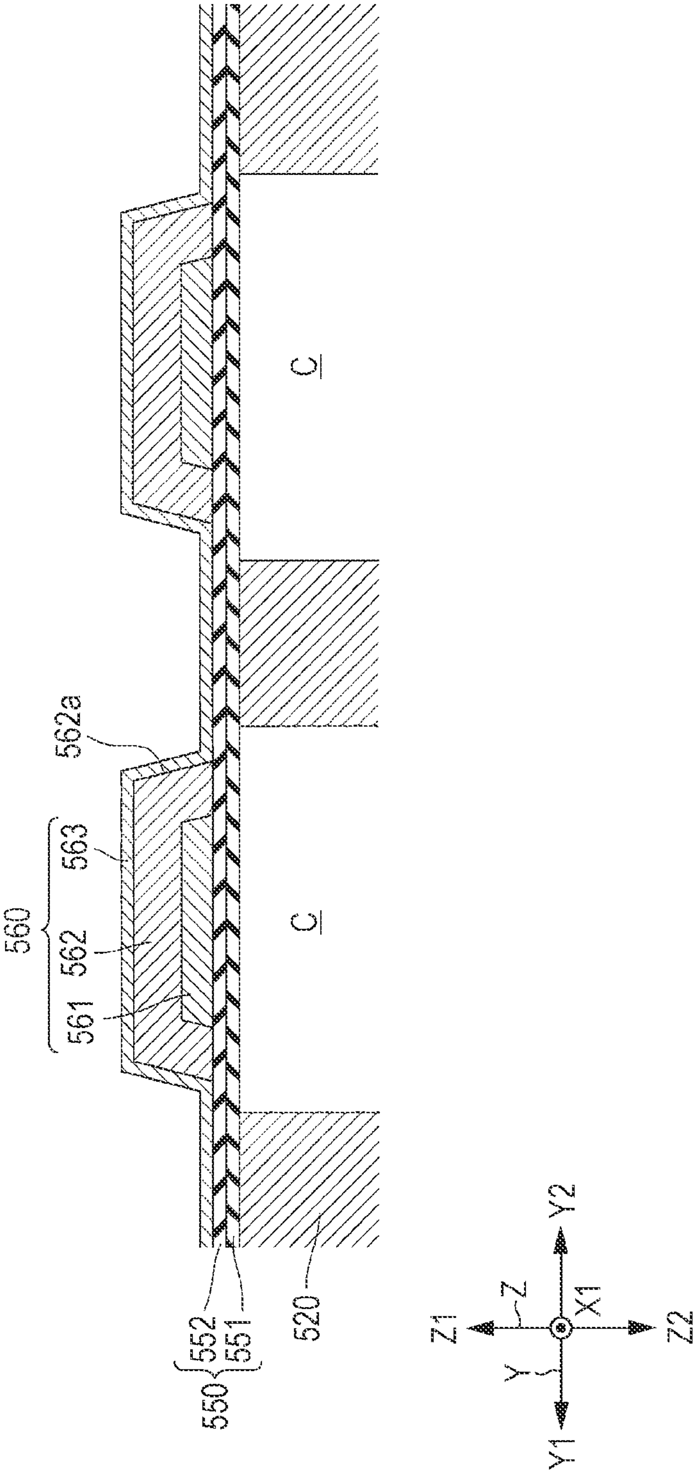
FIG. 6 is a cross-sectional view taken along the line VI-VI in FIG. 5.
Figure 7:
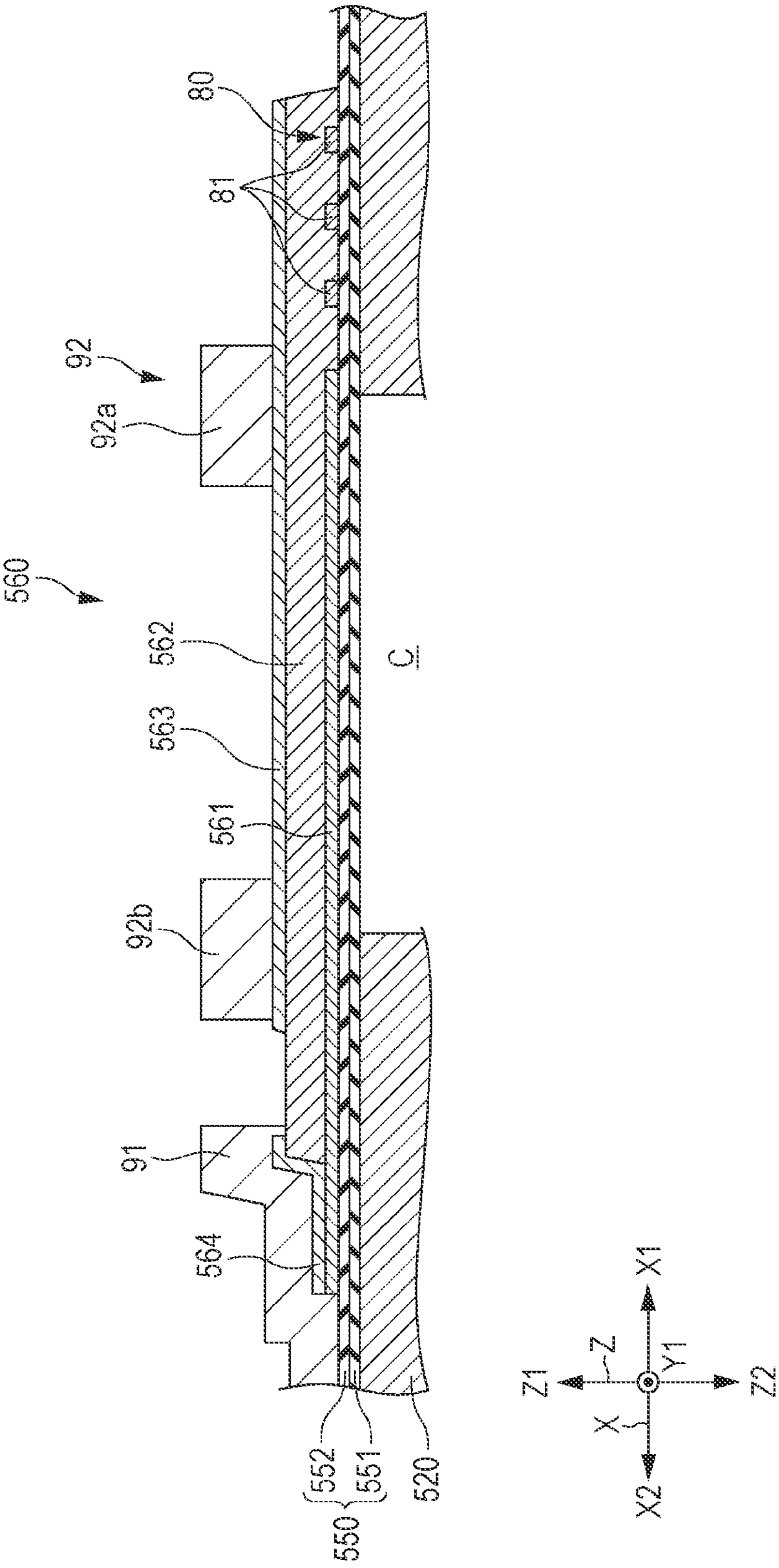
FIG. 7 is a cross-sectional view taken along the line VII-VII in FIG. 5.

FIG. 5 is a plan view of the head chip 51 according to the first embodiment. FIG. 6 is a cross-sectional view taken along the line VI-VI in FIG. 5. FIG. 7 is a cross-sectional view taken along the line VII-VII in FIG. 5. In these drawings, for convenience of description, an element electrically coupled to the wiring substrate 590 on the diaphragm 550 and related elements thereof among the elements constituting the head chip 51 are typically illustrated.

As illustrated in FIGS. 5 to 7, the head chip 51 has an individual drive line 91, a common drive line 92, a detection-line 93, and the resistor 80 in addition to the components described above. Here, in the present embodiment, the head chip 51_1 is an example of a "first liquid discharge section", and the head chip 51_2 is an example of a "second liquid discharge section". Each of the individual drive line 91 and the common drive line 92 included in the head chip 51_1 described above is an example of a "first drive line". Each of the individual drive line 91 and the common drive line 92 included in the head chip 51_2 described above is an example of a "second drive line".

Hereinafter, first, the diaphragm 550 and the piezoelectric element 560 will be described before describing these wirings and the resistor 80.

As illustrated in FIGS. 6 and 7, the diaphragm 550 has an elastic film 551 and an insulating film 552, and these films are laminated in the Z1 direction in this order.

The elastic film 551 is made of, for example, silicon oxide ($SiO_2$), and is formed by thermally oxidizing one surface of a silicon single crystal substrate. The insulating film 552 is made of, for example, zirconium oxide ($ZrO_2$), and is formed by forming a zirconium layer by sputtering and thermally oxidizing the layer.

The diaphragm 550 is not limited to the above-described configuration in which the elastic film 551 and the insulating film 552 are laminated, and may be configured of, for example, a single layer or three or more layers. In addition, the material of each layer constituting the diaphragm 550 is not limited to the above-described material, and may be, for example, silicon or silicon nitride.

The plurality of piezoelectric elements 560 are disposed on the surface of the diaphragm 550 facing the Z1 direction. As illustrated in FIGS. 6 and 7, each piezoelectric element 560 has a first electrode 561, a piezoelectric body 562, and a second electrode 563, which are laminated in this order in the Z1 direction.

The first electrodes 561 are individual electrodes disposed to be separated from each other for the respective piezoelectric elements 560. The supply drive signal Vin corresponding to the drive signal Com is supplied to the first electrode 561. The second electrode 563 is a band-shaped common electrode extending in the direction along the Y axis to be continuous over the plurality of piezoelectric elements 560. The second electrode 563 is supplied with, for example, a constant potential. Examples of a metal material of these electrodes include a metal material such as platinum (Pt), aluminum (Al), nickel (Ni), gold (Au), and copper (Cu). Among these materials, one type can be used alone, or two or more types can be used in combination in a form of an alloy or a laminate.

The piezoelectric body 562 is made of a piezoelectric material such as lead zirconate titanate ($Pb(Zr,Ti)O_3$). In the example illustrated in FIG. 5, the piezoelectric body 562 has a band shape extending in the direction along the Y axis to be continuous over the plurality of piezoelectric elements 560. Here, the piezoelectric body 562 is provided with a through-hole 562*a* penetrating the piezoelectric body 562, which extends in the direction along the X axis, in a region corresponding to a gap between the pressure chambers C adjacent to each other in plan view. The piezoelectric body 562 may be individually provided for each piezoelectric element 560.

As illustrated in FIG. 7, the piezoelectric element 560 of the present embodiment has an interconnection portion 564 in addition to the first electrode 561, the piezoelectric body 562, and the second electrode 563, which are described above. The interconnection portion 564 is individually provided for each piezoelectric element 560, and is disposed to straddle the piezoelectric body 562 and the first electrode 561 at a position closer to the wiring substrate 590 than the second electrode 563, with a distance with respect to the second electrode 563. The interconnection portion 564 is preferably collectively formed with the second electrode 563 through the same film formation process. In this case, a manufacturing process of the head chip 51 can be simplified, and as a result, a cost of the head chip 51 can be reduced.

In such a piezoelectric element 560, the piezoelectric body 562 is deformed by an inverse piezoelectric effect by applying a voltage between the first electrode 561 and the second electrode 563. When the diaphragm 550 vibrates in conjunction with this deformation, the pressure in the pressure chamber C fluctuates, which causes the ink to be discharged from the nozzle N.

As illustrated in FIG. 5, the piezoelectric element 560 described above is electrically coupled to the wiring substrate 590 via the individual drive line 91 and the common drive line 92.

The individual drive line 91 is individually provided for each piezoelectric element 560, and is electrically coupled to the first electrode 561 of the corresponding piezoelectric element 560. On the other hand, the common drive line 92 is provided in common to the plurality of piezoelectric elements 560, and is electrically coupled to the second electrode 563.

The individual drive line 91 and the common drive line 92 are disposed at a distance from each other. Here, the individual drive line 91 and the common drive line 92 are preferably collectively formed through the same film formation process. In this case, a manufacturing process of the head chip 51 can be simplified, and as a result, a cost of the head chip 51 can be reduced.

The constituent materials of each of the individual drive line 91 and the common drive line 92 are not particularly limited as long as they are conductive materials, and examples thereof include metals such as gold (Au), copper (Cu), titanium (Ti), tungsten (W), nickel (Ni), chromium (Cr), platinum (Pt), and aluminum (Al). Among these, gold (Au) is preferably used as the constituent material of the individual drive line 91 and the common drive line 92. The individual drive line 91 and the common drive line 92 may have an adhesion layer for improving adhesion with the first electrode 561, the second electrode 563, and the diaphragm 550.

In the present embodiment, as illustrated in FIG. 7, the individual drive line 91 is coupled to the first electrode 561 via the interconnection portion 564, and extends from a top of the interconnection portion 564 and reaches the diaphragm 550 in a direction toward the wiring substrate 590, for each piezoelectric element 560.

On the other hand, as illustrated in FIG. 5, the common drive line 92 extends from a top of the second electrode 563 and reaches the diaphragm 550 in the direction toward the wiring substrate 590, at both end portions of the second electrode 563 in the Y1 direction and in the Y2 direction. Here, the common drive line 92 has a pair of portions **92*a* and 92*b* extending in the direction along the Y axis. The portion 92*a* of the common drive line 92 overlaps an end farther from the wiring substrate 590 out of both ends of the pressure chamber C in the direction along the X axis, when viewed in the direction along the Z axis. On the other hand, the portion 92*b* of the common drive line 92 overlaps an end closer to the wiring substrate 590 out of both ends of the pressure chamber C in the direction along the X axis, when viewed in the direction along the Z axis. As can be understood from the above, each of the portions 92*a* and 92*b*** extends in the direction along the Y axis over the plurality of pressure chambers C arranged in the direction along the Y axis.

The resistor 80 is a resistance line for detecting the temperature of the ink in the pressure chamber C, and has a characteristic that the resistance value changes according to the change in temperature. Therefore, the resistor 80 is made of a material whose electric resistance value is dependent on the temperature. Note that the resistor 80 is made of the same material as any of the first electrode 561, the second electrode 563, the individual drive line 91, and the common drive line 92. Specifically, examples of the material constituting the resistor 80 include metals such as gold (Au), platinum (Pt), iridium (Ir), aluminum (Al), copper (Cu), titanium (Ti), tungsten (W), nickel (Ni), and chromium (Cr). Among these, platinum (Pt) is preferably adopted as the material constituting the resistor 80 because its resistance value change due to a change in temperature is larger than that of other metals and highly accurate temperature detection is possible.

As illustrated in FIG. 5, the resistor 80 is disposed at a distance from the individual drive line 91 and the common drive line 92 described above. In the example illustrated in FIG. 5, the resistor 80 is disposed at a position that does not overlap the pressure chamber C when viewed in the direction along the Z axis. Therefore, the temperature of the pressure chamber C can be detected by using the resistor 80 without being affected by the deformation of the diaphragm 550. The resistor 80 may be disposed at a position overlapping the pressure chamber C when viewed in the direction along the Z axis. In this case, correction processing in consideration of the deformation of the diaphragm 550 is used for temperature detection using the resistor 80, as necessary.

In the example illustrated in FIG. 5, the resistor 80 has a shape that extends to surround the whole of the plurality of pressure chambers C corresponding to the first nozzle row Ln1 and the plurality of pressure chambers C corresponding to the second nozzle row Ln2, when viewed in the direction along the Z axis. Here, as illustrated in FIGS. 5 and 7, the resistor 80 has a plurality of portions 81 extending in the direction along the Y axis for each nozzle row of the first nozzle row Ln1 and the second nozzle row Ln2. The plurality of portions 81 are arranged at distances from each other in the direction along the X axis. One-side ends of two portions 81 adjacent to each other among the plurality of portions 81 are alternately coupled to each other. Thereby, the resistor 80 has a portion having a meandering shape. Therefore, a length of the resistor 80 can be increased as compared with a configuration without the portion. As a result, the change in the resistance value of the resistor 80 with respect to the change in temperature becomes large, so that the accuracy of the temperature detection using the resistor 80 can be improved. A shape of the resistor 80 in plan view is not limited to the example illustrated in FIG. 5, and may be set in any desired way.

In the example shown in FIG. 7, the resistor 80 is disposed between the diaphragm 550 and the piezoelectric body 562, and is in contact with each of the diaphragm 550 and the piezoelectric body 562. In such a configuration, there is an advantage that the accuracy of the temperature detection using the resistor 80 can be easily improved as compared with a configuration in which the resistor 80 is disposed on a surface of the piezoelectric body 562 facing the Z1 direction. The disposition of the resistor 80 may be any position as long as the resistor 80 is in a position to be a part of the head chip 51, and is not limited to the disposition illustrated in FIG. 7. For example, the resistor 80 may be disposed on the surface of the piezoelectric body 562 facing the Z1 direction, or may be disposed on the diaphragm 550 without being disposed between the diaphragm 550 and the piezoelectric body 562.

Here, the resistor 80 of the present embodiment is disposed at a distance from the first electrode 561, but is preferably collectively formed with the first electrode 561 through the same film formation process. In this case, a manufacturing process of the head chip 51 can be simplified, and as a result, a cost of the head chip 51 can be reduced.

The above resistor 80 is electrically coupled to the wiring substrate 590 via a detection line 93. The detection-line 93 has a detection line **93*a* coupled to one end of the resistor 80 and a detection line 93*b* coupled to the other end of the resistor 80. The detection line 93*a* and 93*b* are electrically coupled to the detection circuit 53 via the wiring substrate 590. Therefore, the current Id can be supplied from the detection circuit 53 to the resistor 80 or the potential Vd of the resistor 80 can be detected by the detection circuit 53, via the detection line 93*a* and 93*b***.

The detection line 93 including the detection line **93*a* and the detection line 93*b* is disposed at a distance from the individual drive line 91 and the common drive line 92, but is preferably collectively formed with the individual drive line 91 and the common drive line 92 through the same film formation process. In this case, a manufacturing process of the head chip 51 can be simplified, and as a result, a cost of the head chip 51** can be reduced.

The materials constituting the detection line 93 are not particularly limited as long as they are conductive materials, and examples thereof include metals such as gold (Au), copper (Cu), titanium (Ti), tungsten (W), nickel (Ni), chromium (Cr), platinum (Pt), and aluminum (Al). Among these, from the viewpoint that the constituent materials of the detection line 93 are the same as the constituent materials of the individual drive line 91 and the common drive line 92, gold (Au) is preferable as the constituent materials of the detection line 93. The detection line 93 may have an adhesion layer for improving adhesion with the resistor 80 or the diaphragm 550, as with the individual drive line 91 and the common drive line 92.

A4: Printing Process and Detection Process

Figure 8:
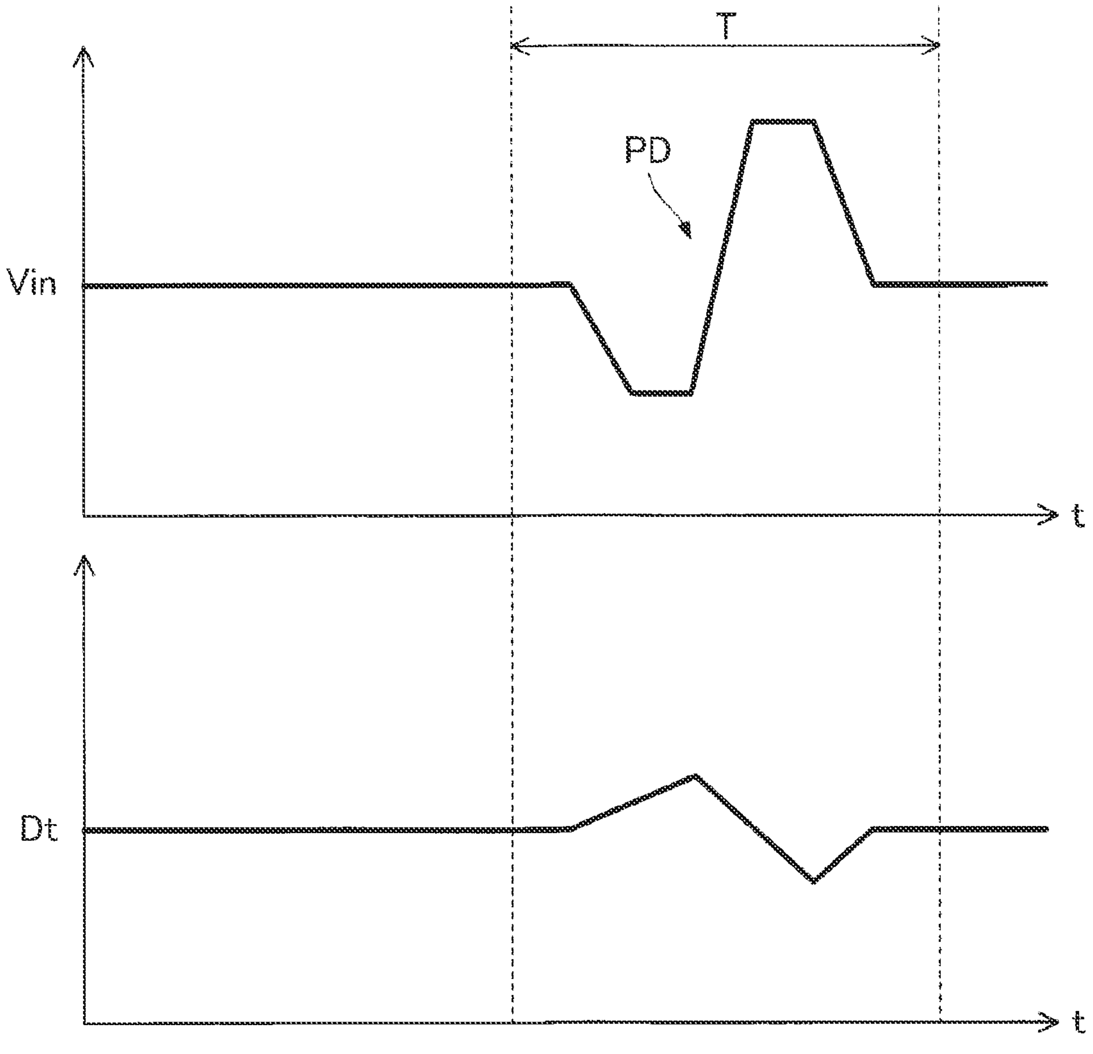
FIG. 8 is a diagram illustrating respective changes with time in a supply drive signal supplied to a piezoelectric element and a detection signal based on a potential of a resistor.

FIG. 8 is a diagram illustrating respective changes with time in the supply drive signal Vin supplied to the piezoelectric element 560 and the detection signal Dt based on the potential Vd of the resistor 80. In FIG. 8, a horizontal axis indicates time t, a vertical axis in an upper part indicates the supply drive signal Vin, and a vertical axis in a lower part indicates the detection signal Dt.

As illustrated in FIG. 8, the supply drive signal Vin in an execution period T of a printing process includes a pulse PD of the drive signal Com. The pulse PD is a potential pulse for driving the piezoelectric element 560 to cause the pressure fluctuation in the ink in the pressure chamber C to the extent that the ink is discharged from the nozzle N. A waveform of the pulse PD is not limited to the example illustrated in FIG. 8 and may be set in any desired way as long as it can cause the pressure fluctuation in the ink in the pressure chamber C to the extent that the ink is discharged from the nozzle N.

Here, in the execution period T of the printing process, noise caused by the pulse PD is mixed into the detection signal Dt. This is because the resistor 80 is disposed at a position extremely close to the piezoelectric element 560 in the liquid discharge head 50. Therefore, during the execution period T of the printing process, the accuracy of the temperature detection using the resistor 80 decreases.

Therefore, in the present embodiment, the temperature detection using the resistor 80 is performed during a period different from the execution period T of the printing process. Hereinafter, this point will be described in detail.

Figure 9:
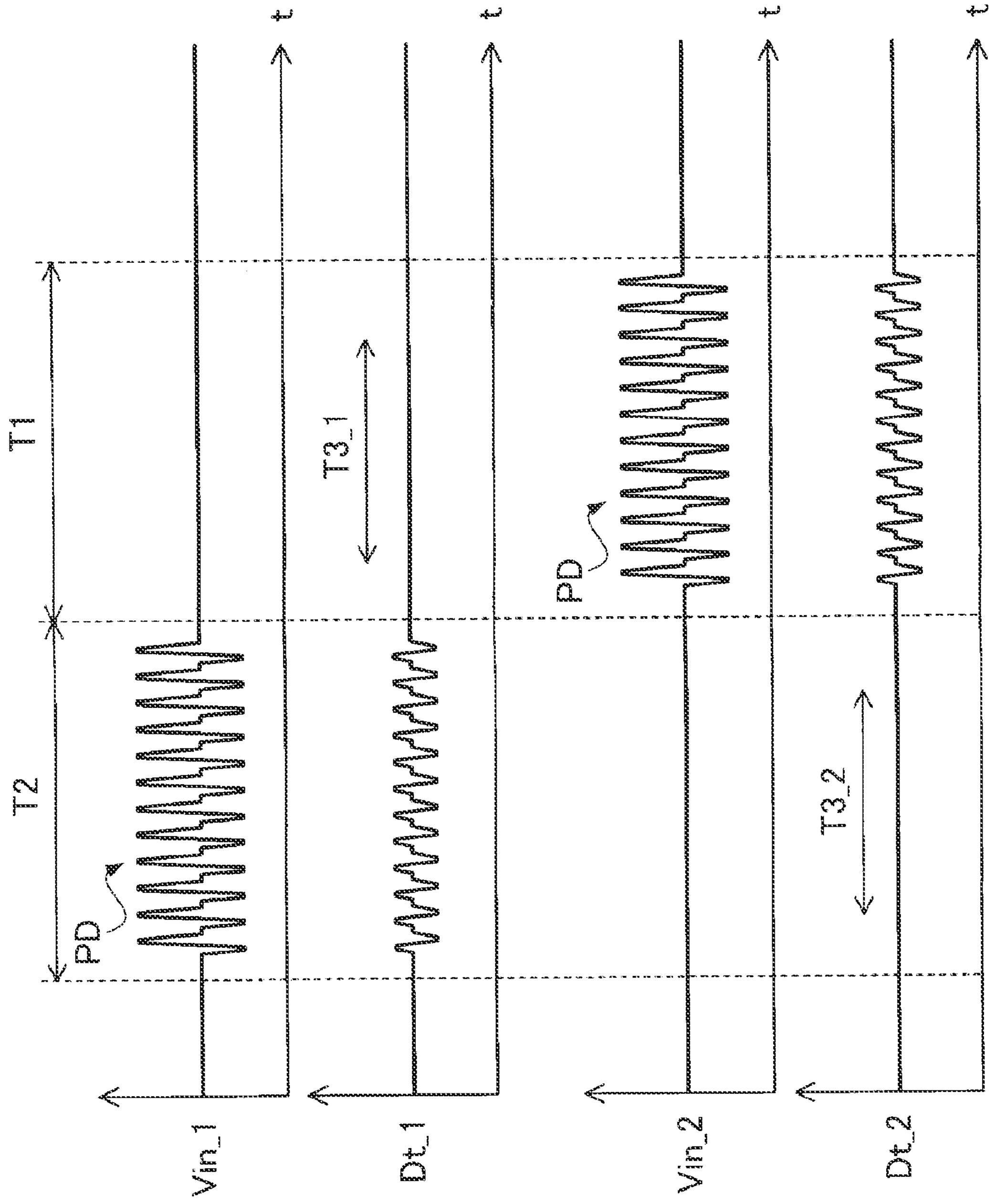
FIG. 9 is a diagram illustrating a relationship between execution periods of a first printing process, a second printing process, and potential detection in the first embodiment.

FIG. 9 is a diagram illustrating a relationship between execution periods of a first printing process, a second printing process, and potential detection. In FIG. 9, a horizontal axis indicates time t, a vertical axis of a first stage indicates the supply drive signal Vin_1 of the head chip 51_1, a vertical axis of a second stage indicates the detection signal Dt_1 of the head chip 51_1, a vertical axis of a third stage indicates the supply drive signal Vin_2 of the head chip 51_2, and a vertical axis of a fourth stage indicates the detection signal Dt_2 of the head chip 51_2.

FIG. 9 illustrates an aspect in which the first printing process is executed after the second printing process is executed. Here, in the first printing process, a first image is printed on the recording medium M by an ink discharged from a nozzle N2 of the head chip 51_2 without discharging an ink from a nozzle N1 of the head chip 51_1. In the second printing process, a second image is printed on the recording medium M by an ink discharged from the nozzle N1 of the head chip 51_1 without discharging an ink from the nozzle N2 of the head chip 51_2. Either one of the first printing process and the second printing process can be repeated a plurality of times. Alternatively, the first printing process and the second printing process can be alternately repeated. Alternatively, either one of the first printing process and the second printing process can be executed only once.

The first image and the second image are images formed by different types of ink. For example, a combination of the first image and the second image includes a combination of an image with a color ink and an image with a white ink, a combination of an image with a matte black ink and an image with a photo black ink, a combination of an image with a top coat clear ink and an image with a color ink, a combination of an image with a metallic ink and an image with a color ink, and a combination of an image with a black ink and an image with a color ink other than black. The first image and the second image may be images obtained in different passes in multi-pass printing, or may be images based on individual print data.

During the execution period T1 of the first printing process, the supply drive signal Vin_2 includes the pulse PD, and the piezoelectric element 560 of the head chip 51_2 is driven so that an ink is discharged from the nozzle N of the head chip 51_2. The number of the pulses PD included in the supply drive signal Vin_2 in the execution period T1 is not limited to the example illustrated in FIG. 9, and is set in any desired way.

Here, during the execution period T1 of the first printing process, a detection process of detecting the potential of the resistor 80 of the head chip 51_1 is performed over a period T3_1. Since a state of the potential applied to the individual drive line 91 and the common drive line 92 of the head chip 51_1 that is not used for the printing process is a state of causing no liquid to be discharged from the nozzle N of the head chip 51_1, the noise can be prevented from being mixed into the detection signal Dt_1 as described above.

Specifically, a potential with a smaller potential change than the drive signal Com_2 is applied to the individual drive line 91 and the common drive line 92 of the head chip 51_1 over the period T3_1. In the example illustrated in FIG. 9, no potential is applied to the individual drive line 91 and the common drive line 92 of the head chip 51_1 over the period T3_1. For example, under the control of the control module 20, the drive circuit 52_1 switches to a state in which a signal line of the drive signal Com_1 and a signal line of the supply drive signal Vin_1 are not coupled to each other. Alternatively, a constant potential is applied to the individual drive line 91 and the common drive line 92 of the head chip 51_1 over the period T3_1. For example, under the control of the control module 20, the drive circuit 52_1 performs switching such that the signal line of the drive signal Com_1 and the signal line of the supply drive signal Vin_1 are not coupled to each other in the period including the pulse PD of the drive signal Com_1, and that the signal line of the drive signal Com_1 and the signal line of the supply drive signal Vin_1 are coupled to each other in the period in which the potential not including the pulse PD of the drive signal Com_1 is maintained constant. Alternatively, under the control of the control module 20, the drive circuit 52_1 switches to a state in which a signal line of the drive signal Com, which maintains a constant potential, other than the drive signal Com_1 and the signal line of the supply drive signal Vin_1 are coupled to each other. The period T3_1 need only be within the execution period T1, is not limited to the example illustrated in FIG. 9, and is set in any desired way. In addition, the potential applied to the individual drive line 91 and the common drive line 92 of the head chip 51_1 over the period T3_1 need only be a potential with a smaller potential change than the drive signal Com_2, is not limited to the example illustrated in FIG. 9, and is set in any desired way.

During a execution period T2 of the second printing process, the supply drive signal Vin_1 includes the pulse PD, and the piezoelectric element 560 of the head chip 51_1 is driven so that an ink is discharged from the nozzle N of the head chip 51_1. The number of the pulses PD included in the supply drive signal Vin_1 in the execution period T2 is not limited to the example illustrated in FIG. 9, and is set in any desired way.

Here, during the execution period T2 of the second printing process, a detection process of detecting the potential of the resistor 80 of the head chip 51_2 is performed over a period T3_2. Since a state of the potential applied to the individual drive line 91 and the common drive line 92 of the head chip 51_2 that is not used for the printing process is a state of causing no liquid to be discharged from the nozzle N of the head chip 51_2, the noise can be prevented from being mixed into the detection signal Dt_1 as described above.

Specifically, a potential with a smaller potential change than the drive signal Com_1 is applied to the individual drive line 91 and the common drive line 92 of the head chip 51_2 over the period T3_2. In the example illustrated in FIG. 9, no potential is applied to the individual drive line 91 and the common drive line 92 of the head chip 51_2 over the period T3_2. For example, under the control of the control module 20, the drive circuit 52_2 switches to a state in which a signal line of the drive signal Com_2 and a signal line of the supply drive signal Vin_2 are not coupled to each other. Alternatively, a constant potential is applied to the individual drive line 91 and the common drive line 92 of the head chip 51_2 over the period T3_2. For example, under the control of the control module 20, the drive circuit 52_2 performs switching such that the signal line of the drive signal Com_2 and the signal line of the supply drive signal Vin_2 are not coupled to each other in the period including the pulse PD of the drive signal Com_2, and that the signal line of the drive signal Com_2 and the signal line of the supply drive signal Vin_2 are coupled to each other in the period in which the potential not including the pulse PD of the drive signal Com_2 is maintained constant. Alternatively, under the control of the control module 20, the drive circuit 52_2 switches to a state in which a signal line of the drive signal Com, which maintains a constant potential, other than the drive signal Com_2 and the signal line of the supply drive signal Vin_2 are coupled to each other. The period T3_2 need only be within the execution period T2, is not limited to the example illustrated in FIG. 9, and is set in any desired way. In addition, the potential applied to the individual drive line 91 and the common drive line 92 of the head chip 51_2 over the period T3_1 need only be a potential with a smaller potential change than the drive signal Com_1, is not limited to the example illustrated in FIG. 9, and is set in any desired way.

In the present embodiment, the potential of the resistor 80 of the head chip 51_1 is detected by the detection circuit 53 in the first printing process. The detection circuit 53 outputs the detection signal Dt_1 based on the potential Vd_1 of the resistor 80 of the head chip 51_1. Since the head chip 51_1 and the head chip 51_2 are disposed on the nozzle surface FN of the same liquid discharge head 50 and are placed in the same environment, the temperature of the head chip 51_1 and the temperature of the head chip 51_2 are similar. Therefore, during the first printing process, the correction portion 21*a* corrects the drive signal Com_2 to be supplied to the piezoelectric element 560 of the head chip 51_2 or adjusts the set temperature by the heater 70, based on the detection signal Dt_1.

In addition, the potential of the resistor 80 of the head chip 51_2 is detected by the detection circuit 53 in the second printing process. The detection circuit 53 outputs the detection signal Dt_2 based on the potential Vd_2 of the resistor 80 of the head chip 51_2. During the second printing process, the correction portion 21*a* corrects the drive signal Com_1 to be supplied to the piezoelectric element 560 of the head chip 51_1 or adjusts the set temperature by the heater 70, based on the detection signal Dt_2.

Thus, by accurately measuring the temperature by using the head chip 51, which is not used for the printing process, and by adjusting the drive signal Com to be supplied to the head chip 51, which is used for the printing process, and the temperature of the heater 70, it is not necessary to interrupt the printing process to measure the temperature, and a print quality can be maintained without reducing throughput.

The correction portion 21*a* can also correct the drive signal Com_1 to be supplied to the piezoelectric element 560 of the head chip 51_1 or adjust the set temperature by the heater 70, based on the detection signal Dt_1. In addition, the correction portion 21*a* can also correct the drive signal Com_2 to be supplied to the piezoelectric element 560 of the head chip 51_2 or adjust the set temperature by the heater 70, based on the detection signal Dt_2.

As described above, the liquid discharge apparatus 100 includes the nozzle N of the head chip 51_1 as an example of the "first nozzle", the pressure chamber C of the head chip 51_1 as an example of the "first pressure chamber", the piezoelectric element 560 of the head chip 51_1 as an example of the "first piezoelectric element", the individual drive line 91 and the common drive line 92 of the head chip 51_1 as an example of the "first drive line", the resistor 80 of the head chip 51_1 as an example of the "first resistor", the nozzle N of the head chip 51_2 as an example of the "second nozzle", the pressure chamber C of the head chip 51_2 as an example of the "second pressure chamber", and the piezoelectric element 560 of the head chip 51_2 as an example of the "second piezoelectric element".

Here, the pressure chamber C of the head chip 51_1 communicates with the nozzle N of the head chip 51_1. The piezoelectric element 560 of the head chip 51_1 applies a pressure to the liquid in the pressure chamber C of the head chip 51_1. The individual drive line 91 and the common drive line 92 of the head chip 51_1 are coupled to the piezoelectric element 560 of the head chip 51_1. The resistor 80 of the head chip 51_1 is a resistor for measuring the temperature of the liquid in the pressure chamber C of the head chip 51_1.

The pressure chamber C of the head chip 51_2 communicates with the nozzle N of the head chip 51_2. The piezoelectric element 560 of the head chip 51_2 applies a pressure to the liquid in the pressure chamber C of the head chip 51_2.

The piezoelectric element 560 of each of the head chips 51_1 and 51_2 has the first electrode 561, the second electrode 563, and the piezoelectric body 562 disposed between the first electrode 561 and the second electrode 563. The resistor 80 of the head chip 51_1 is made of the same material as any of the first electrode 561, the second electrode 563, the individual drive line 91, and the common drive line 92 of the head chip 51_1.

In the drive method of the liquid discharge apparatus 100 described above, during the execution period T1 of the first printing process of printing the first image on the recording medium M by the liquid discharged from the nozzle N of the head chip 51_2, the potential of the resistor 80 of the head chip 51_1 is detected when the potential applied to the individual drive line 91 and the common drive line 92 of the head chip 51_1 is in a state of causing no liquid to be discharged from the nozzle N of the head chip 51_1.

In the above drive method, the potential of the resistor 80 of the head chip 51_1 is detected when the potential applied to the individual drive line 91 and the common drive line 92 of the head chip 51_1 is in a state of causing no liquid to be discharged from the nozzle N of the head chip 51_1, so that even when the resistor 80 of the head chip 51_1 is provided in the liquid discharge head 50, the potential of the resistor 80 of the head chip 51_1 can be detected with high accuracy without being affected by the supply drive signal Vin_1 corresponding to the drive signal Com_1 for driving the piezoelectric element 560 of the head chip 51_1 to discharge the ink from the nozzle N1. As a result, the temperature of the liquid in the pressure chamber C of the head chip 51_1 can be detected with high accuracy based on the potential.

Here, the temperature detection during the execution period T1 of the first printing process of discharging the ink from the nozzle N2 of the head chip 51_2 and printing the first image is performed by detecting the potential of the resistor 80 of the head chip 51_1 that is not used for printing the first image, so that a decrease in throughput of the printing process can be prevented as compared with a case where the potential of the resistor 80 of the head chip 51_2 is detected by providing a period during which no ink is discharged from the nozzle N2 of the head chip 51_2 during the execution period T1.

In the present embodiment, as described above, the resistor 80 of the head chip 51_1 has a portion that is in contact with the piezoelectric body 562 of the piezoelectric element 560 of the head chip 51_1, and does not contact the head chip 51_2. Therefore, a distance between the resistor 80 and the pressure chamber C in the head chip 51_1 can be shortened as compared with a configuration in which the resistor 80 of the head chip 51_1 is not in contact with the piezoelectric body 562. As a result, the temperature of the liquid in the pressure chamber C of the head chip 51_1 can be detected with high accuracy based on the potential of the resistor 80 of the head chip 51_1. In addition, in such a configuration, when the piezoelectric element 560 is driven, noise due to the supply drive signal Vin_1 corresponding to the drive signal Com_1 is likely to be mixed into the detection signal Dt_1 based on the potential of the resistor 80, but the effect of detecting the potential of the resistor 80 of the head chip 51_1 when the potential applied to the individual drive line 91 and the common drive line 92 of the head chip 51_1 is in a state of causing no liquid to be discharged from the nozzle N of the head chip 51_1 becomes significant. In addition, even in the period during which the first image is printed with the liquid discharged from the nozzle N2 of the head chip 51_2, the resistor 80 of the head chip 51_1 does not contact the head chip 51_2, so that noise due to the supply drive signal Vin_2 corresponding to the drive signal Com_2 supplied to the head chip 51_2 is not mixed into the detection signal Dt_1, and the temperature of the liquid in the pressure chamber C of the head chip 51_1 can be detected with high accuracy.

In addition, the resistor 80 of the head chip 51_2 has a portion that is in contact with the piezoelectric body 562 of the piezoelectric element 560 of the head chip 51_2, and does not contact the head chip 51_1. Thereby, even in the period during which the second image is printed with the liquid discharged from the nozzle N1 of the head chip 51_1, the noise due to the supply drive signal Vin_1 corresponding to the drive signal Com_1 supplied to the head chip 51_1 is not mixed into the detection signal Dt_2, and the temperature of the liquid in the pressure chamber C of the head chip 51_2 can be detected with high accuracy.

In addition, in the drive method of the present embodiment, as described above, during the execution period T1 of the first printing process, no potential is applied to the individual drive line 91 and the common drive line 92 of the head chip 51_1 over the period T3_1 during which the potential of the resistor 80 of the head chip 51_1 is detected. Therefore, the potential of the resistor 80 of the head chip 51_1 can be detected with high accuracy without being affected by the supply drive signal Vin_1 corresponding to the drive signal Com_1 for driving the piezoelectric element 560 of the head chip 51_1.

Here, in the drive method of the present embodiment, as described above, during the execution period T1 of the first printing process, a constant potential is applied to the individual drive line 91 and the common drive line 92 of the head chip 51_1 over the period T3_1 during which the potential of the resistor 80 of the head chip 51_1 is detected. Therefore, the potential of the resistor 80 of the head chip 51_1 can be detected with high accuracy without being affected by the supply drive signal Vin_1 corresponding to the drive signal Com_1 for driving the piezoelectric element 560 of the head chip 51_1.

In addition, as described above, during the execution period T1 of the first printing process, the piezoelectric element 560 of the head chip 51_2 is driven to discharge the ink from the nozzle N2 by receiving the supply of the supply drive signal Vin_2 corresponding to the drive signal Com_2. Moreover, in the drive method of the present embodiment, during the execution period T1 of the first printing process, a potential with a smaller potential change than the drive signal Com_2 is applied to the individual drive line 91 and the common drive line 92 of the head chip 51_1 over the period T3_1 during which the potential of the resistor 80 of the head chip 51_1 is detected. Therefore, the potential of the resistor 80 of the head chip 51_1 can be detected with high accuracy without being affected by the supply drive signal Vin_1 corresponding to the drive signal Com_1 for driving the piezoelectric element 560 of the head chip 51_1.

Furthermore, in the drive method of the present embodiment, as described above, the drive signal Com_1 to be supplied to the piezoelectric element 560 of the head chip 51_2 is corrected based on the potential of the resistor 80 of the head chip 51_1. Therefore, the appropriate drive signal Com_1 can be supplied to the piezoelectric element 560 of the head chip 51_2 according to the change in temperature of the liquid in the pressure chamber C of the head chip 51_1.

In addition, as described above, the support section 60 that supports the recording medium M facing the nozzles N1 and N2 of the head chips 51_1 and 51_2 is heated to the set temperature by the heater 70. Moreover, in the drive method of the present embodiment, the set temperature is corrected based on the potential of the resistor 80 of the head chip 51_1. Therefore, the support section 60 can be heated at an appropriate temperature according to the change in temperature of the liquid in the pressure chamber C of the head chip 51_1.

Furthermore, as described above, the liquid discharge head 50 further includes the individual drive line 91 and the common drive line 92 of the head chip 51_2 as an example of the “second drive line”, and the resistor 80 of the head chip 51_2 as an example of the “second resistor”. The individual drive line 91 and the common drive line 92 of the head chip 51_2 are coupled to the piezoelectric element 560 of the head chip 51_2. The resistor 80 of the head chip 51_2 is a resistor for measuring the temperature of the liquid in the pressure chamber C of the head chip 51_2. The resistor 80 of the head chip 51_2 is made of the same material as any of the first electrode 561, the second electrode 563, the individual drive line 91, and the common drive line 92 of the head chip 51_2.

Moreover, in the drive method of the present embodiment, as described above, during the execution period T2 of the second printing process of printing the second image on the recording medium M by the liquid discharged from the nozzle N of the head chip 51_1, the potential of the resistor 80 of the head chip 51_2 is detected when the potential applied to the individual drive line 91 and the common drive line 92 of the head chip 51_2 is in a state of causing no liquid to be discharged from the nozzle N of the head chip 51_2.

Therefore, even when the resistor 80 of the head chip 51_2 is provided in the liquid discharge head, the potential of the resistor 80 of the head chip 51_2 can be detected with high accuracy without being affected by the drive signal for driving the piezoelectric element 560 of the head chip 51_2. As a result, the temperature of the liquid in the pressure chamber C of the head chip 51_2 can be detected with high accuracy based on the potential. Here, the detection of the potential of the resistor 80 of the head chip 51_2 is performed during the execution period T2 of the second printing process, so that a decrease in throughput of the printing process can be prevented as compared with a case where the potential of the resistor 80 of the head chip 51_2 is detected during a period other than the execution period T2.

B: Second Embodiment

Hereinafter, a second embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 10:
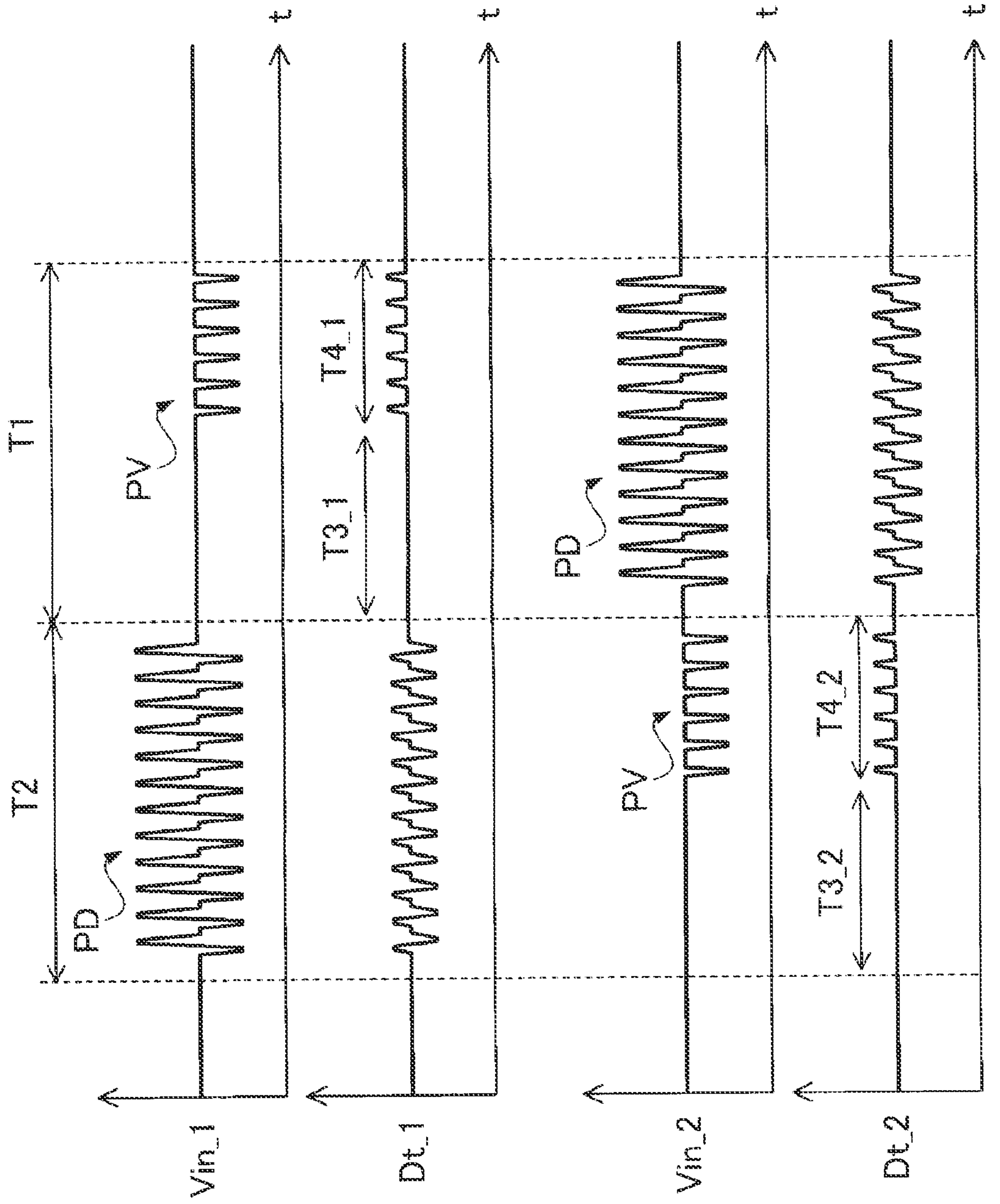
FIG. 10 is a diagram illustrating a relationship between execution periods of a first printing process, a second printing process, and potential detection in a second embodiment.

FIG. 10 is a diagram illustrating a relationship between execution periods of a first printing process, a second printing process, and potential detection in the second embodiment. The second embodiment is the same as the above-described first embodiment except that a minute vibration process is added.

During the execution period T1 of the first printing process of the present embodiment, a minute vibration process of minutely vibrating a meniscus of the ink in the nozzle N without discharging the ink from the nozzle N of the head chip 51_1 is performed over a period T4_1 after the detection process over the period T3_1. A pulse PV is included in the supply drive signal Vin_1 of the period T4_1. The pulse PV is a potential pulse for driving the piezoelectric element 560 to cause, in the pressure chamber C, the pressure fluctuation that is strong enough to prevent the ink from being discharged from the nozzle N. By supplying the pulse PV to the piezoelectric element 560, the meniscus of the ink in the nozzle N is minutely vibrated without discharging the ink from the nozzle N. The ink in the nozzle N is stirred by the minute vibration, so that the ink is smoothly replaced between the nozzle N and the communication flow path Na. Therefore, thickening of the ink in the nozzle N is prevented. A length or the like of the periods T3_1 and T4_1 is not limited to the example illustrated in FIG. 10, and is set in any desired way.

In the example illustrated in FIG. 10, the period T4_1 does not overlap the period T3_1. Therefore, the temperature detection using the resistor 80 of the head chip 51_1 can be performed with higher accuracy as compared with an aspect in which the period T4_1 overlaps the period T3_1. The period T4_1 may overlap the period T3_1. Even in this case, the potential change of the pulse PV is smaller than the potential change of the pulse PD, so that the temperature detection using the resistor 80 of the head chip 51_1 can be performed with higher accuracy as compared with a case where the potential of the resistor 80 of the head chip 51_1 is detected during a period other than the execution period T1.

Here, the period T4_1 is after the period T3_1 as described above, but the meniscus of the ink vibrates due to residual vibration in the nozzle N in a predetermined period immediately after the ink is discharged, so that the ink is stirred. Therefore, even when the piezoelectric element 560 is not separately driven for vibrating the meniscus of the ink in the nozzle N in the period T3_1, thickening of the ink in the nozzle N is prevented. The period T4_1 may be before the period T3_1.

As with the above first printing process, during the execution period T2 of the second printing process of the present embodiment, a minute vibration process of minutely vibrating a meniscus of the ink in the nozzle N without discharging the ink from the nozzle N of the head chip 51_2 is performed over a period T4_2 after the detection process over the period T3_2. A pulse PV is included in the supply drive signal Vin_2 of the period T4_2. A length or the like of the periods T3_2 and T4_2 is not limited to the example illustrated in FIG. 10, and is set in any desired way.

Also according to the second embodiment described above, the temperature of the liquid in the pressure chamber C of the liquid discharge head 50 can be detected with high accuracy. In the drive method of the present embodiment, as described above, during the execution period T1 of the first printing process, the individual drive line 91 and the common drive line 92 of the head chip 51_1 are applied with a potential that changes to stir the liquid in the nozzle N of the head chip 51_1 without discharging the liquid from the nozzle N of the head chip 51_1, over the period T4_1 different from the period T3_1 during which the potential of the resistor 80 of the head chip 51_1 is detected. Therefore, it is possible to effectively utilize the execution period T1 of the first printing process and to stir the liquid in the nozzle N of the head chip 51_1 without reducing the detection accuracy of the potential of the resistor 80 of the head chip 51_1.

C: Third Embodiment

Hereinafter, a third embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 11:
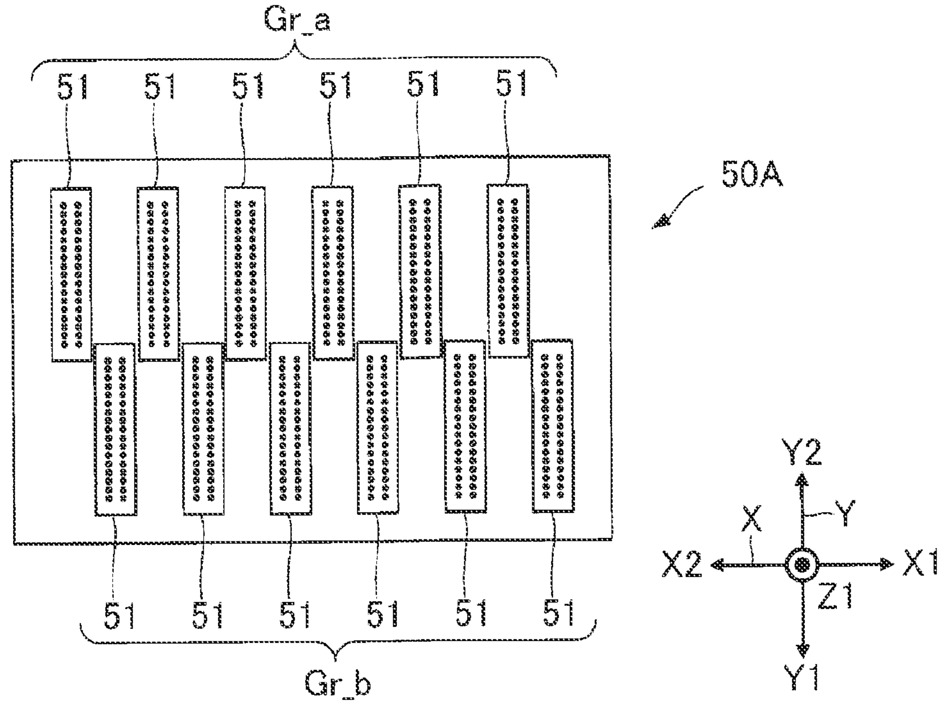
FIG. 11 is a diagram for illustrating a liquid discharge head in a third embodiment.

FIG. 11 is a diagram for illustrating a liquid discharge head 50A in the third embodiment. The liquid discharge head 50A has the same configuration as the liquid discharge head 50 of the first embodiment described above, except that the number and disposition of the head chips 51 are different.

As illustrated in FIG. 11, the liquid discharge head 50A has a plurality of head chips 51 disposed in a staggered manner. In the example illustrated in FIG. 11, the number of the head chips 51 included in the liquid discharge head 50A is 12. The number of the head chips 51 included in the liquid discharge head 50A is not limited to the example illustrated in FIG. 11, and is set in any desired way.

The plurality of head chips 51 included in the liquid discharge head 50A are divided into a group Gr_a consisting of the plurality of head chips 51 arranged in the direction along the X axis, and a group Gr_b consisting of the plurality of head chips 51 arranged in the direction along the X axis at positions shifted in the Y1 direction with respect to the group Gr_a. The types of inks used for the group Gr_a and the group Gr_b may be the same as or different from each other. The number of the head chips 51 belonging to each group is not limited to the example illustrated in FIG. 11, and is set in any desired way.

In the liquid discharge head 50A as described above, when the types of inks used for the group Gr_a and the group Gr_b are different from each other, the first printing process is performed using the group Gr_b. In addition, in this case, the second printing process is performed using the group Gr_a in a period different from the execution period of the first printing process. Here, the temperature detection using the resistors 80 of the group Gr_b is performed during the execution period of the first printing process. Similarly, the temperature detection using the resistors 80 of the group Gr_a is performed during the execution period of the second printing process. That is, the head chip 51 belonging to the group Gr_a is the head chip 51_1, and the head chip 51 belonging to the group Gr_b is the head chip 51_2.

The temperature detection using the resistor 80 of the group Gr_b need only be performed by using the resistor 80 of at least one head chip 51 among the plurality of head chips 51_2 belonging to the group Gr_b. Similarly, the temperature detection using the resistor 80 of the group Gr_a need only be performed by using the resistor 80 of at least one head chip 51_1 among the plurality of head chips 51 belonging to the group Gr_a. Here, when the temperature detection is performed by using the resistors 80 of the plurality of head chips 51, the detection signal Vt is generated based on a statistical value such as an average value, a median value, or a mode of the potentials Vd of the plurality of resistors 80, for example.

In addition, in the liquid discharge head 50A, when the types of inks used for the group Gr_a and the group Gr_b are the same as each other, the printing is performed using both the group Gr_a and the group Gr_b when an image quality is prioritized over a printing speed. In addition, in this case, when the printing speed is prioritized over the image quality, the printing is performed using the group Gr_b without using the group Gr_a. Here, when the printing speed is prioritized over the image quality, the first image is formed at the recording medium M by the first printing process using the group Gr_b. During the execution period of the first printing process, the temperature detection using the resistors 80 of the group Gr_b is performed. That is, the head chip 51 belonging to the group Gr_a is the head chip 51_1, and the head chip 51 belonging to the group Gr_b is the head chip 51_2.

When the printing speed is prioritized over the image quality, the printing may be performed by the second printing process using the group Gr_a without using the group Gr_b. Here, the temperature detection using the resistors 80 of the group Gr_a is performed during the execution period of the second printing process.

In the present embodiment, the potential of the resistor 80 of the head chip 51_1 belonging to the group Gr_a is detected by the detection circuit 53 in the first printing process. The detection circuit 53 outputs the detection signal Dt_1 based on the potential Vd_1 of the resistor 80 of the head chip 51_1. Since the head chip 51_1 of the group Gr_a and the head chip 51_2 of the group Gr_b are disposed on the nozzle surface FN of the same liquid discharge head 50A and are placed in the same environment, the temperature of the head chip 51_1 and the temperature of the head chip 51_2 are similar. Therefore, during the first printing process, the correction portion 21*a* corrects the drive signal Com_2 to be supplied to the piezoelectric element 560 of the head chip 51_2 or adjusts the set temperature by the heater 70, based on the detection signal Dt_1.

In addition, the potential of the resistor 80 of the head chip 51_2 belonging to the group Gr_b is detected by the detection circuit 53 in the second printing process. The detection circuit 53 outputs the detection signal Dt_2 based on the potential Vd_2 of the resistor 80 of the head chip 51_2. During the second printing process, the correction portion 21*a* corrects the drive signal Com_1 to be supplied to the piezoelectric element 560 of the head chip 51_1 or adjusts the set temperature by the heater 70, based on the detection signal Dt_2.

Thus, by accurately measuring the temperature by using the head chip 51, which is not used for the printing process, and by adjusting the drive signal Com to be supplied to the head chip 51, which is used for the printing process, and the temperature of the heater 70, the print quality can be maintained without reducing throughput.

Also according to the third embodiment described above, the temperature of the liquid in the pressure chamber C of the liquid discharge head 50A can be detected with high accuracy. In the present embodiment, in the head chip 51 belonging to the group used for the temperature detection in the first printing process, the nozzle N corresponds to the "first nozzle", the pressure chamber C corresponds to the "first pressure chamber", the piezoelectric element 560 corresponds to the "first piezoelectric element", the individual drive line 91 and the common drive line 92 correspond to the "first drive line", and the resistor 80 corresponds to the "first resistor". In addition, in the head chip 51 belonging to the group used for the temperature detection in the second printing process, the nozzle N corresponds to the "second nozzle", the pressure chamber C corresponds to the "second pressure chamber", the piezoelectric element 560 corresponds to the "second piezoelectric element", the individual drive line 91 and the common drive line 92 correspond to the "second drive line", and the resistor 80 corresponds to the "second resistor".

D: Fourth Embodiment

Hereinafter, a fourth embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 12:
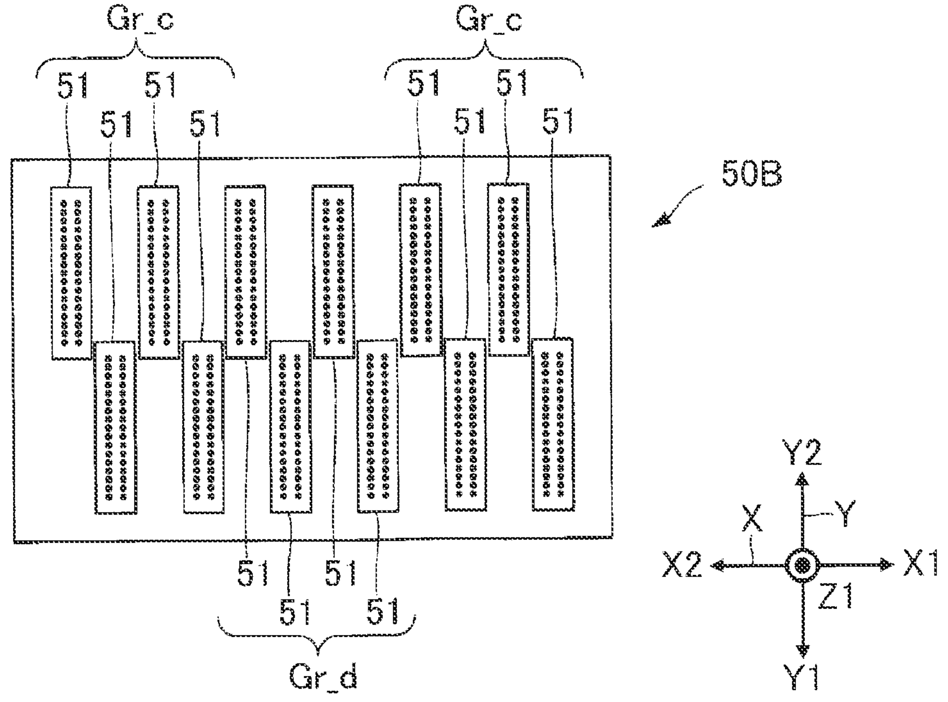
FIG. 12 is a diagram for illustrating a liquid discharge head in a fourth embodiment.

FIG. 12 is a diagram for illustrating a liquid discharge head 50B in the fourth embodiment. The liquid discharge head 50B has the same configuration as the liquid discharge head 50 of the first embodiment described above, except that the number and disposition of the head chips 51 are different.

As illustrated in FIG. 12, the liquid discharge head 50B has a plurality of head chips 51 disposed in a staggered manner, as in the above-described third embodiment. The number of the head chips 51 included in the liquid discharge head 50B is not limited to the example illustrated in FIG. 12, and is set in any desired way.

The head chips 51 included in the liquid discharge head 50B are divided into a group Gr_d consisting of the plurality of head chips 51 located near the center of the liquid discharge head 50B in the direction along the X axis, and a group Gr_c consisting of the plurality of head chips 51 disposed at respective positions in the X1 direction and in the X2 direction with respect to the group Gr_d. The number of the head chips 51 belonging to each group is not limited to the example illustrated in FIG. 12, and is set in any desired way.

The head chip 51_2 belonging to the group Gr_c is used for the first printing process of printing the first image on the recording medium M by the ink discharged from the nozzle N. On the other hand, the head chip 51_1 belonging to the group Gr_d is not used for the printing process but is used only for the temperature detection. Here, the head chip 51_1 belonging to the group Gr_d need not be filled with an ink, but, from the viewpoint of improving the accuracy of the temperature detection, it is preferable that the head chip 51_1 is filled with a liquid having a temperature characteristic which is the same as or similar to that of the ink used for the head chip 51_2 belonging to the group Gr_c.

In the liquid discharge head 50B as described above, the first printing process is performed using the group Gr_c. During the execution period of the first printing process, the temperature detection using the resistors 80 of the group Gr_d is performed.

In the present embodiment, the potential of the resistor 80 of the head chip 51_1 belonging to the group Gr_d is detected by the detection circuit 53 in the first printing process. The detection circuit 53 outputs the detection signal Dt_1 based on the potential Vd_1 of the resistor 80 of the head chip 51_1. Since the head chip 51_1 of the group Gr_d and the head chip 51_2 of the group Gr_c are disposed on the nozzle surface FN of the same liquid discharge head 50B and are placed in the same environment, the temperature of the head chip 51_1 and the temperature of the head chip 51_2 are similar. Therefore, during the first printing process, the correction portion 21*a* corrects the drive signal Com_2 to be supplied to the piezoelectric element 560 of the head chip 51_2 or adjusts the set temperature by the heater 70, based on the detection signal Dt_1.

Thus, by accurately measuring the temperature by using the head chip 51, which is not used for the printing process, and by adjusting the drive signal Com to be supplied to the head chip 51, which is used for the printing process, and the temperature of the heater 70, the print quality can be maintained without reducing throughput.

Also according to the fourth embodiment described above, the temperature of the liquid in the pressure chamber C of the liquid discharge head 50B can be detected with high accuracy. In the present embodiment, in the head chip 51 belonging to the group used for the temperature detection in the first printing process, the nozzle N corresponds to the "first nozzle", the pressure chamber C corresponds to the "first pressure chamber", the piezoelectric element 560 corresponds to the "first piezoelectric element", the individual drive line 91 and the common drive line 92 correspond to the "first drive line", and the resistor 80 corresponds to the "first resistor".

E: Fifth Embodiment

Hereinafter, a fifth embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 13:
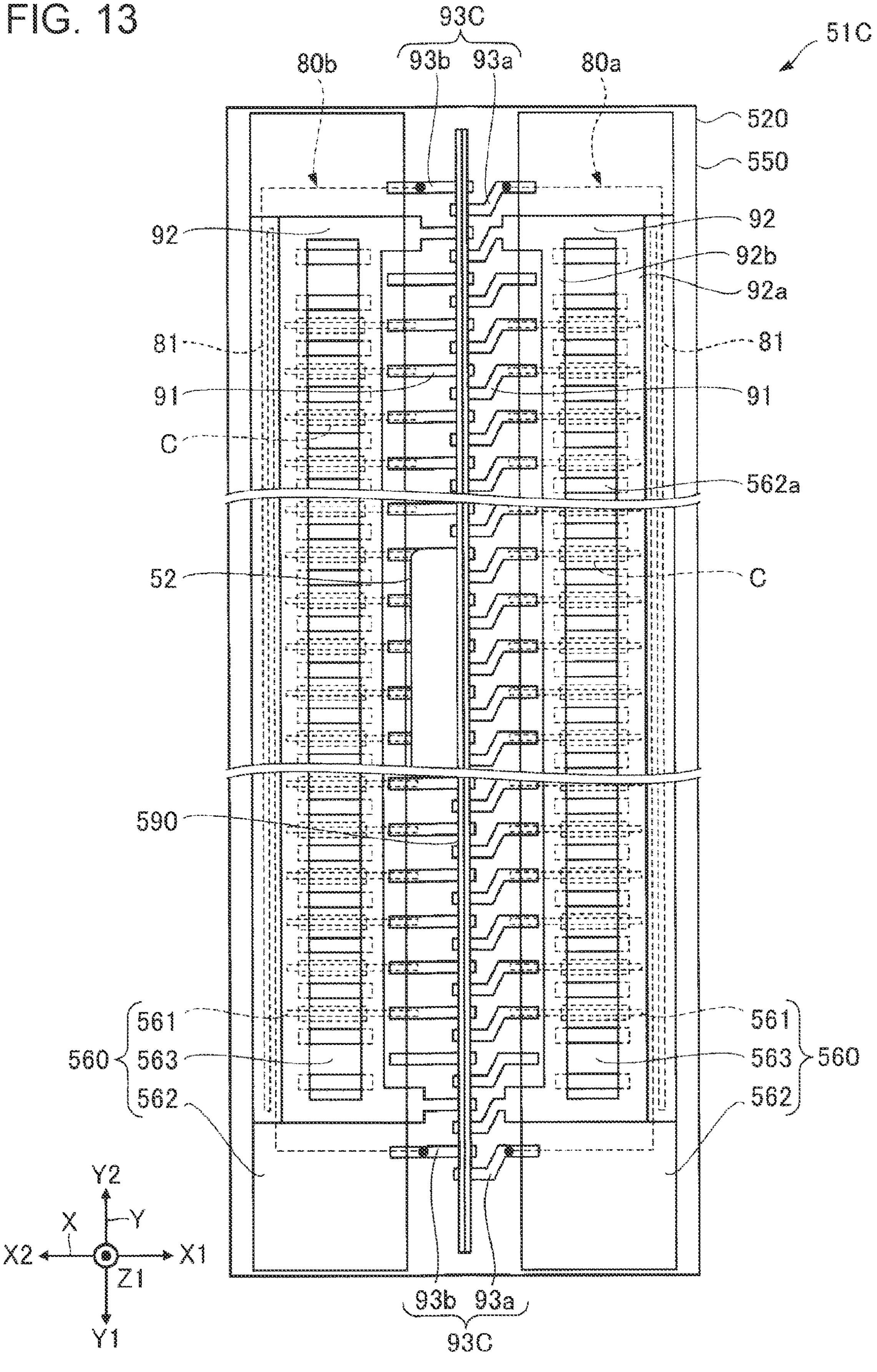
FIG. 13 is a diagram for illustrating a head chip used in a liquid discharge head in a fifth embodiment.

FIG. 13 is a diagram for illustrating a head chip 51C used in a liquid discharge head in the fifth embodiment. The head chip 51C has the same configuration as the head chip 51 of the first embodiment described above, except that resistors 80*a* and 80*b* are provided instead of the resistor 80 and a detection line 93C is provided instead of the detection line 93.

The resistors 80*a* and 80*b* have the same configuration as the resistor 80 of the first embodiment, except that the resistor 80 of the first embodiment is divided into two parts with a coupling position between the wiring substrate 590 and the diaphragm 550 as a boundary. Here, the resistor 80*a* has a shape that extends to surround the plurality of pressure chambers C corresponding to the first nozzle row Ln1 when viewed in the direction along the Z axis. The resistor 80*b* has a shape that extends to surround the plurality of pressure chambers C corresponding to the second nozzle row Ln2 when viewed in the direction along the Z axis.

The above resistors 80*a* and 80*b* are electrically coupled to the wiring substrate 590 via the detection line 93C. The detection line 93C has a pair of detection lines 93*a* coupled to both ends of the resistor 80*a* and a pair of detection lines 93*b* coupled to both ends of the resistor 80*b*. The pair of detection lines 93*a* and the pair of detection lines 93*b* are electrically coupled to the detection circuit 53 via the wiring substrate 590. Therefore, the current Id can be supplied from the detection circuit 53 to the resistor 80*a* or the potential Vd of the resistor 80*a* can be detected by the detection circuit 53, via the pair of detection lines 93*a*. Similarly, the current Id can be supplied from the detection circuit 53 to the resistor 80*b* or the potential Vd of the resistor 80*b* can be detected by the detection circuit 53, via the pair of detection lines 93*b*.

When the above head chip 51C is used, the first printing process is performed using the second nozzle row Ln2. In addition, in this case, the second printing process is performed using the first nozzle row Ln1 in a period different from the execution period of the first printing process. Here, the temperature detection using the resistors 80 corresponding to the first nozzle row Ln1 is performed during the execution period of the first printing process. Similarly, the temperature detection using the resistors 80 corresponding to the second nozzle row Ln2 is performed during the execution period of the second printing process.

Here, in the present embodiment, the first nozzle row Ln1 is an example of the "first liquid discharge section", and the second nozzle row Ln2 is an example of the "second liquid discharge section". Each of the plurality of nozzles N constituting the first nozzle row Ln1 is an example of the "first nozzle", and each of the plurality of nozzles N constituting the second nozzle row Ln2 is an example of the "second nozzle". As described above, the nozzle N corresponding to the "first nozzle" and the nozzle N corresponding to the "second nozzle" may be the same component of the head chip 51C. In the present embodiment, the type of the liquid discharged from the first nozzle row Ln1 may be the same as or different from the type of the liquid discharged from the second nozzle row Ln2.

In the present embodiment, in the first printing process, the first image is printed on the recording medium M by the liquid discharged from the nozzle N2 of the second nozzle row Ln2 without discharging the liquid from the nozzle N1 of the first nozzle row Ln1. The detection circuit 53 detects the potential of the resistor 80*a* corresponding to the first nozzle row Ln1 in which the liquid is not discharged from the nozzle N1 in the printing of the first image. The detection circuit 53 outputs the detection signal Dt_1 based on the potential Vd_1 of the resistor 80 corresponding to the first nozzle row Ln1. Since the first nozzle row Ln1 and the second nozzle row Ln2 are configured in the same head chip 51 and are placed in the same environment, the temperature of the first nozzle row Ln1 and the temperature of the second nozzle row Ln2 are similar. Therefore, during the first printing process, the correction portion 21*a* corrects the drive signal Com to be supplied to the piezoelectric element 560 of the head chip 51 or adjusts the set temperature by the heater 70, based on the detection signal Dt_1. In addition, the resistor 80*a* of the first nozzle row Ln1 has a portion that is in contact with the piezoelectric body 562 of the piezoelectric element 560 of the first nozzle row Ln1, and does not contact the second nozzle row Ln2. The fact that the resistor 80*a* does not contact the second nozzle row Ln2 means that the resistor 80*a* does not contact the piezoelectric element 560, the individual drive line 91, and the common drive line 92 included in the second nozzle row Ln2. Thereby, even in the period during which the first image is printed with the liquid discharged from the nozzle N2 of the second nozzle row Ln2, the noise due to the supply drive signal Vin_2 corresponding to the drive signal Com supplied to the second nozzle row Ln2 is not mixed into the detection signal Dt_1, and the temperature of the liquid in the pressure chamber C of the first nozzle row Ln1 can be detected with high accuracy.

In addition, in the second printing process, the second image is printed on the recording medium M by the liquid discharged from the nozzle N1 of the first nozzle row Ln1 without discharging the liquid from the nozzle N2 of the second nozzle row Ln2. The detection circuit 53 detects the potential of the resistor 80 corresponding to the second nozzle row Ln2 in which the liquid is not discharged from the nozzle N2 in the printing of the second image. The detection circuit 53 outputs the detection signal Dt_2 based on the potential Vd_2 of the resistor 80 corresponding to the second nozzle row Ln2. Since the first nozzle row Ln1 and the second nozzle row Ln2 are configured in the same head chip 51 and are placed in the same environment, the temperature of the first nozzle row Ln1 and the temperature of the second nozzle row Ln2 are similar. Therefore, during the second printing process, the correction portion 21*a* corrects the drive signal Com to be supplied to the piezoelectric element 560 of the head chip 51 or adjusts the set temperature by the heater 70, based on the detection signal Dt_2. In addition, the resistor 80*b* of the second nozzle row Ln2 has a portion that is in contact with the piezoelectric body 562 of the piezoelectric element 560 of the second nozzle row Ln2, and does not contact the first nozzle row Ln1. The fact that the resistor 80*b* does not contact the first nozzle row Ln1 means that the resistor 80*b* does not contact the piezoelectric element 560, the individual drive line 91, and the common drive line 92 included in the first nozzle row Ln1. Thereby, even in the period during which the second image is printed with the liquid discharged from the nozzle N1 of the first nozzle row Ln1, the noise due to the supply drive signal Vin_1 corresponding to the drive signal Com supplied to the first nozzle row Ln1 is not mixed into the detection signal Dt_2, and the temperature of the liquid in the pressure chamber C of the second nozzle row Ln2 can be detected with high accuracy.

Thus, by accurately measuring the temperature by using the nozzle row Ln, which is not used for the printing process, and by adjusting the drive signal Com to be supplied to the nozzle row Ln, which is used for the printing process, and the temperature of the heater 70, the print quality can be maintained without reducing throughput.

Also according to the fifth embodiment described above, the temperature of the liquid in the pressure chamber C of the liquid discharge head can be detected with high accuracy. In the present embodiment, for the elements corresponding to the second nozzle row Ln2 used for the printing in the first printing process, the pressure chamber C corresponds to the "second pressure chamber", the piezoelectric element 560 corresponds to the "second piezoelectric element", the individual drive line 91 and the common drive line 92 correspond to the "second drive line", and the resistor 80 corresponds to the "second resistor". In addition, for the elements corresponding to the first nozzle row Ln1 used for the printing in the second printing process, the pressure chamber C corresponds to the "second pressure chamber", the piezoelectric element 560 corresponds to the "second piezoelectric element", the individual drive line 91 and the common drive line 92 correspond to the "second drive line", and the resistor 80 corresponds to the "second resistor".

F: Modification Example

Each embodiment in the above illustration can be variously modified. Specific modification aspects that can be applied to each of the above-described embodiments are exemplified below. The aspects selected in any manner from the following examples can be appropriately combined with each other within a range of not being inconsistent with each other.

F1: Modification Example 1

In each of the above-described embodiments, the serial type liquid discharge apparatus 100 in which the transport body 41 having the head chip 51 mounted thereon is reciprocated is exemplified, but the present disclosure can also be applied to a line type liquid discharge apparatus in which the plurality of nozzles N are distributed over the entire width of the recording medium M.

F2: Modification Example 2

The liquid discharge apparatus 100 exemplified in the above-described embodiment may be adopted in various devices such as a facsimile machine and a copier, in addition to a device dedicated to printing, and the application of the present disclosure is not particularly limited. Note that the application of the liquid discharge apparatus is not limited to printing. For example, a liquid discharge apparatus that discharges a solution of a coloring material is used as a manufacturing apparatus that forms a color filter of a display apparatus such as a liquid crystal display panel. In addition, a liquid discharge apparatus that ejects a solution of a conductive material is used as a manufacturing apparatus that forms a wire or an electrode on a wiring substrate. In addition, a liquid discharge apparatus that ejects a solution of an organic substance related to a living body is used, for example, as a manufacturing apparatus that manufactures a biochip.

What is claimed is:

1. A drive method of a liquid discharge apparatus including a first liquid discharge section having a first nozzle, a first pressure chamber that is configured to communicate with the first nozzle, a first piezoelectric element that is configured to apply a pressure to a liquid in the first pressure chamber, a first drive line that is configured to be coupled to the first piezoelectric element, and a first resistor that is configured to measure a temperature of the liquid in the first pressure chamber, and a second liquid discharge section having a second nozzle, a second pressure chamber that is configured to communicate with the second nozzle, and a second piezoelectric element that is configured to apply a pressure to a liquid in the second pressure chamber, in which each of the first piezoelectric element and the second piezoelectric element has a first electrode, a second electrode, and a piezoelectric body disposed between the first electrode and the second electrode, and the first resistor is made of the same material as any of the first electrode, the second electrode, and the first drive line, the method comprising:
- detecting a potential of the first resistor when a state of a potential applied to the first drive line is in a state of causing no liquid to be discharged from the first nozzle, during an execution period of a first printing process of printing a first image on a recording medium by a liquid discharged from the second nozzle without discharging a liquid from the first nozzle,
- wherein the first resistor has a portion in contact with the piezoelectric body of the first piezoelectric element, and does not contact the second liquid discharge section, and
- during the execution period of the first printing process, the first drive line is applied with a potential that changes to stir a liquid in the first nozzle without discharging the liquid from the first nozzle, over a period different from a period during which the potential of the first resistor is detected.

2. The drive method of a liquid discharge apparatus according to claim 1, wherein
- during the execution period of the first printing process, no potential is applied to the first drive line over the period during which the potential of the first resistor is detected.

3. The drive method of a liquid discharge apparatus according to claim 1, wherein
- during the execution period of the first printing process, a constant potential is applied to the first drive line over the period during which the potential of the first resistor is detected.

4. The drive method of a liquid discharge apparatus according to claim 1, wherein
- during the execution period of the first printing process, the second piezoelectric element is driven to discharge the liquid from the second nozzle by receiving a supply of a drive signal, and
- during the execution period of the first printing process, a potential with a smaller potential change than the drive signal is applied to the first drive line over the period during which the potential of the first resistor is detected.

5. The drive method of a liquid discharge apparatus according to claim 1, wherein
- a drive signal to be supplied to the second piezoelectric element is corrected based on the potential of the first resistor.

6. The drive method of a liquid discharge apparatus according to claim 1, wherein
- a support section that supports the recording medium facing the first nozzle and the second nozzle is heated to a set temperature by a heater, and
- the set temperature is corrected based on the potential of the first resistor.

7. The drive method of a liquid discharge apparatus according to claim 1, wherein
- the second liquid discharge section further has
  - a second drive line that is configured to couple to the second piezoelectric element, and
  - a second resistor that is configured to measure a temperature of the liquid in the second pressure chamber,
- the second resistor is made of the same material as any of the first electrode, the second electrode, and the second drive line, and
- a potential of the second resistor is detected when a state of a potential applied to the second drive line is in a state of causing no liquid to be discharged from the second nozzle, during an execution period of a second printing process of printing a second image on the recording medium by a liquid discharged from the first nozzle without discharging a liquid from the second nozzle.

8. A drive method of a liquid discharge apparatus including a first liquid discharge section having a first nozzle, a first pressure chamber that is configured to communicate with the first nozzle, a first piezoelectric element that is configured to apply a pressure to a liquid in the first pressure chamber, a first drive line that is configured to be coupled to the first piezoelectric element, and a first resistor that is configured to measure a temperature of the liquid in the first pressure chamber, and a second liquid discharge section having a second nozzle, a second pressure chamber that is configured to communicate with the second nozzle, and a second piezoelectric element that is configured to apply a pressure to a liquid in the second pressure chamber, in which each of the first piezoelectric element and the second piezoelectric element has a first electrode, a second electrode, and a piezoelectric body disposed between the first electrode and the second electrode, and the first resistor is made of the same material as any of the first electrode, the second electrode, and the first drive line, the method comprising:
- detecting a potential of the first resistor when a state of a potential applied to the first drive line is in a state of causing no liquid to be discharged from the first nozzle, during an execution period of a first printing process of printing a first image on a recording medium by a liquid discharged from the second nozzle without discharging a liquid from the first nozzle,
- wherein a drive signal to be supplied to the second piezoelectric element is corrected based on the potential of the first resistor.

9. The drive method of a liquid discharge apparatus according to claim 8, wherein
- during the execution period of the first printing process, no potential is applied to the first drive line over a period during which the potential of the first resistor is detected.

10. The drive method of a liquid discharge apparatus according to claim 8, wherein during the execution period of the first printing process, a constant potential is applied to the first drive line over a period during which the potential of the first resistor is detected.

11. The drive method of a liquid discharge apparatus according to claim 8, wherein during the execution period of the first printing process, the second piezoelectric element is driven to discharge the liquid from the second nozzle by receiving a supply of a drive signal, and during the execution period of the first printing process, a potential with a smaller potential change than the drive signal is applied to the first drive line over a period during which the potential of the first resistor is detected.

12. The drive method of a liquid discharge apparatus according to claim 8, wherein during the execution period of the first printing process, the first drive line is applied with a potential that changes to stir a liquid in the first nozzle without discharging the liquid from the first nozzle, over a period different from a period during which the potential of the first resistor is detected.

13. The drive method of a liquid discharge apparatus according to claim 8, wherein the second liquid discharge section further has a second drive line that is configured to couple to the second piezoelectric element, and a second resistor that is configured to measure a temperature of the liquid in the second pressure chamber, the second resistor is made of the same material as any of the first electrode, the second electrode, and the second drive line, and a potential of the second resistor is detected when a state of a potential applied to the second drive line is in a state of causing no liquid to be discharged from the second nozzle, during an execution period of a second printing process of printing a second image on the recording medium by a liquid discharged from the first nozzle without discharging a liquid from the second nozzle.

14. A drive method of a liquid discharge apparatus including a first liquid discharge section having a first nozzle, a first pressure chamber that is configured to communicate with the first nozzle, a first piezoelectric element that is configured to apply a pressure to a liquid in the first pressure chamber, a first drive line that is configured to be coupled to the first piezoelectric element, and a first resistor that is configured to measure a temperature of the liquid in the first pressure chamber, and a second liquid discharge section having a second nozzle, a second pressure chamber that is configured to communicate with the second nozzle, and a second piezoelectric element that is configured to apply a pressure to a liquid in the second pressure chamber, in which each of the first piezoelectric element and the second piezoelectric element has a first electrode, a second electrode, and a piezoelectric body disposed between the first electrode and the second electrode, and the first resistor is made of the same material as any of the first electrode, the second electrode, and the first drive line, the method comprising:

detecting a potential of the first resistor when a state of a potential applied to the first drive line is in a state of causing no liquid to be discharged from the first nozzle, during an execution period of a first printing process of printing a first image on a recording medium by a liquid discharged from the second nozzle without discharging a liquid from the first nozzle, wherein a support section that supports the recording medium facing the first nozzle and the second nozzle is heated to a set temperature by a heater, and the set temperature is corrected based on the potential of the first resistor.

15. The drive method of a liquid discharge apparatus according to claim 14, wherein during the execution period of the first printing process, no potential is applied to the first drive line over a period during which the potential of the first resistor is detected.

16. The drive method of a liquid discharge apparatus according to claim 14, wherein during the execution period of the first printing process, a constant potential is applied to the first drive line over a period during which the potential of the first resistor is detected.

17. The drive method of a liquid discharge apparatus according to claim 14, wherein during the execution period of the first printing process, the second piezoelectric element is driven to discharge the liquid from the second nozzle by receiving a supply of a drive signal, and during the execution period of the first printing process, a potential with a smaller potential change than the drive signal is applied to the first drive line over a period during which the potential of the first resistor is detected.

18. The drive method of a liquid discharge apparatus according to claim 14, wherein during the execution period of the first printing process, the first drive line is applied with a potential that changes to stir a liquid in the first nozzle without discharging the liquid from the first nozzle, over a period different from a period during which the potential of the first resistor is detected.

19. The drive method of a liquid discharge apparatus according to claim 14, wherein the second liquid discharge section further has a second drive line that is configured to couple to the second piezoelectric element, and a second resistor that is configured to measure a temperature of the liquid in the second pressure chamber, the second resistor is made of the same material as any of the first electrode, the second electrode, and the second drive line, and a potential of the second resistor is detected when a state of a potential applied to the second drive line is in a state of causing no liquid to be discharged from the second nozzle, during an execution period of a second printing process of printing a second image on the recording medium by a liquid discharged from the first nozzle without discharging a liquid from the second nozzle.

* * * * *